US012809734B2

(12) United States Patent
Osipov

(10) Patent No.: US 12,809,734 B2

(45) Date of Patent: Nov. 24, 2026

(54) LIMITING SHARING OF VISUAL DATA

(71) Applicant: Venn Technology Corporation, New York, NY (US)

(72) Inventor: Aleksandr Osipov, Tarrytown, NY (US)

(73) Assignee: Venn Technology Corporation, New York, NY (US)

(*) Notice: Subject to any disclaimer, the term of this patent is extended or adjusted under 35 U.S.C. 154(b) by 54 days.

(21) Appl. No.: 19/038,934

(22) Filed: Jan. 28, 2025

(65) Prior Publication Data

US 2025/0258747 A1 Aug. 14, 2025

Related U.S. Application Data

(60) Provisional application No. 63/553,387, filed on Feb. 14, 2024.

(51) Int. Cl.

*G06F 11/30* (2006.01)
*G06F 11/32* (2006.01)

(52) U.S. Cl.

CPC ........ *G06F 11/3041* (2013.01); *G06F 11/324* (2013.01)

(58) Field of Classification Search

CPC ........................... G06F 11/3041; G06F 11/324
See application file for complete search history.

(56) References Cited

U.S. PATENT DOCUMENTS

| | | | |
|---|---|---|---|
| 5,870,543 | A | 2/1999 | Ronning |
| 5,874,958 | A | 2/1999 | Ludolph |
| 6,658,571 | B1 | 12/2003 | O'Brien et al. |
| 7,162,719 | B2 | 1/2007 | Schmidt |
| 7,779,247 | B2 | 8/2010 | Roegner |

(Continued)

FOREIGN PATENT DOCUMENTS

| | | | |
|---|---|---|---|
| CN | 101513008 | B | 9/2012 |
| CN | 103299658 | A | 9/2013 |

(Continued)

OTHER PUBLICATIONS

Non-Final Office Action dated Nov. 2, 2022 for U.S. Appl. No. 17/890,798.

(Continued)

*Primary Examiner* — Henry Tsai
*Assistant Examiner* — John B Roche
(74) *Attorney, Agent, or Firm* — Young Basile Hanlon & MacFarlane, P.C.

(57) ABSTRACT

A computer receives, at a low-level engine or using software that communicates with the low-level engine, a request for computing data associated with a capturing process. The low-level engine comprises at least one of a kernel, a driver, or a desktop window manager. The computer generates the computing data for provision to the capturing process responsive to the request. Generating the computing data comprises determining to include visual data associated with a window in the computing data based on at least one of an identifier of the window or an identifier of the capturing process. The computer displays a visual indicator to indicate that the visual data associated with the window is being transmitted to the capturing process. The computer provides the computing data to the capturing process.

20 Claims, 12 Drawing Sheets

(56) References Cited

U.S. PATENT DOCUMENTS

| | | | |
|---|---|---|---|
| 7,926,086 | B1 | 4/2011 | Violleau et al. |
| 7,930,273 | B1 | 4/2011 | Clark et al. |
| 8,255,280 | B1 | 8/2012 | Kay et al. |
| 8,495,731 | B1 | 7/2013 | Mar et al. |
| 9,021,559 | B1 | 4/2015 | Vetter et al. |
| 9,307,451 | B1 | 4/2016 | Kodeswaran et al. |
| 9,461,978 | B2 | 10/2016 | Mishra et al. |
| 9,519,765 | B2 | 12/2016 | Brown et al. |
| 9,646,152 | B2 | 5/2017 | Lam et al. |
| 9,785,341 | B2 | 10/2017 | Stallings et al. |
| 10,044,757 | B2 | 8/2018 | Qureshi et al. |
| 10,152,197 | B1 | 12/2018 | Xue |
| 10,254,942 | B2 | 4/2019 | Vranjes et al. |
| 10,630,716 | B1 | 4/2020 | Ghosh et al. |
| 10,657,246 | B2 | 5/2020 | Biswas et al. |
| 10,728,230 | B2 | 7/2020 | Lawson et al. |
| 11,086,984 | B2 | 8/2021 | Shannon |
| 11,687,644 | B2 | 6/2023 | Osipov et al. |
| 11,704,431 | B2 | 7/2023 | Kraus et al. |
| 11,750,475 | B1 | 9/2023 | Gonzalez et al. |
| 11,902,330 | B1 | 2/2024 | Dods |
| 2002/0178119 | A1 | 11/2002 | Griffin et al. |
| 2004/0162781 | A1 | 8/2004 | Searl et al. |
| 2005/0182750 | A1 | 8/2005 | Krishna et al. |
| 2006/0041405 | A1 | 2/2006 | Chen et al. |
| 2006/0236363 | A1 | 10/2006 | Heard et al. |
| 2007/0033273 | A1 | 2/2007 | White et al. |
| 2007/0094673 | A1 | 4/2007 | Hunt et al. |
| 2007/0186274 | A1 | 8/2007 | Thrysoe et al. |
| 2007/0239987 | A1 | 10/2007 | Hoole et al. |
| 2008/0134071 | A1 | 6/2008 | Keohane et al. |
| 2009/0177979 | A1 | 7/2009 | Garbow et al. |
| 2009/0187648 | A1 | 7/2009 | Sunkammurali et al. |
| 2009/0328215 | A1 | 12/2009 | Arzi et al. |
| 2010/0122271 | A1 | 5/2010 | Labour et al. |
| 2010/0319053 | A1 | 12/2010 | Gharabally |
| 2011/0113467 | A1 | 5/2011 | Agarwal et al. |
| 2012/0030729 | A1 | 2/2012 | Schwartz et al. |
| 2012/0210333 | A1 | 8/2012 | Potter et al. |
| 2012/0233314 | A1 | 9/2012 | Jakobsson |
| 2013/0031549 | A1 | 1/2013 | Osmond |
| 2013/0160141 | A1 | 6/2013 | Tseng et al. |
| 2013/0232238 | A1 | 9/2013 | Cohn et al. |
| 2013/0291055 | A1 | 10/2013 | Muppidi et al. |
| 2013/0332996 | A1 | 12/2013 | Fiala et al. |
| 2013/0339518 | A1 | 12/2013 | Schimpfky et al. |
| 2014/0007184 | A1 | 1/2014 | Porras |
| 2014/0095894 | A1 | 4/2014 | Barton et al. |
| 2014/0380406 | A1 | 12/2014 | Saidi et al. |
| 2014/0380414 | A1 | 12/2014 | Saidi et al. |
| 2015/0134735 | A1 | 5/2015 | Momchilov et al. |
| 2016/0070626 | A1 | 3/2016 | Raghavendra |
| 2016/0099972 | A1 | 4/2016 | Qureshi et al. |
| 2016/0255139 | A1 | 9/2016 | Rathod |
| 2016/0315967 | A1 | 10/2016 | Trevathan et al. |
| 2017/0041344 | A1 | 2/2017 | Nandakumar et al. |
| 2017/0250919 | A1 | 8/2017 | Kessel et al. |
| 2018/0176661 | A1* | 6/2018 | Varndell ............ H04N 21/2187 |
| 2018/0191766 | A1 | 7/2018 | Holeman et al. |
| 2018/0267696 | A1 | 9/2018 | Peshkar |
| 2018/0341499 | A1 | 11/2018 | Tse |
| 2019/0199808 | A1 | 6/2019 | Gamache et al. |
| 2020/0036739 | A1 | 1/2020 | Novikov et al. |
| 2020/0059492 | A1 | 2/2020 | Janakiraman et al. |
| 2020/0192867 | A1 | 6/2020 | McBeath |
| 2020/0200892 | A1* | 6/2020 | Rajab .................... G01S 13/753 |
| 2020/0204576 | A1 | 6/2020 | Davis et al. |
| 2020/0233951 | A1 | 7/2020 | Biswas et al. |
| 2020/0244637 | A1 | 7/2020 | Main et al. |
| 2020/0320454 | A1 | 10/2020 | Almashor et al. |
| 2020/0356677 | A1 | 11/2020 | Alexander et al. |
| 2021/0051155 | A1 | 2/2021 | Sloane et al. |
| 2022/0012351 | A1 | 1/2022 | Sanders et al. |
| 2022/0179983 | A1 | 6/2022 | Kassa et al. |
| 2022/0215094 | A1 | 7/2022 | Gupta |
| 2022/0269782 | A1 | 8/2022 | Chang et al. |
| 2022/0336078 | A1 | 10/2022 | Wise et al. |
| 2022/0365861 | A1 | 11/2022 | DeFilippo et al. |
| 2023/0053983 | A1 | 2/2023 | Osipov et al. |
| 2023/0054350 | A1 | 2/2023 | Osipov et al. |
| 2023/0056056 | A1 | 2/2023 | Osipov et al. |
| 2023/0058203 | A1 | 2/2023 | Osipov et al. |
| 2023/0059726 | A1 | 2/2023 | Osipov et al. |
| 2023/0101145 | A1 | 3/2023 | Osipov et al. |
| 2023/0308474 | A1 | 9/2023 | Thompson |
| 2023/0362651 | A1 | 11/2023 | Lie |
| 2024/0007506 | A1 | 1/2024 | Cage et al. |
| 2024/0184901 | A1 | 6/2024 | Osipov et al. |
| 2024/0187414 | A1 | 6/2024 | Osipov et al. |

FOREIGN PATENT DOCUMENTS

| | | | |
|---|---|---|---|
| CN | 102365554 | B | 1/2015 |
| CN | 106790231 | A | 5/2017 |
| CN | 110727942 | A | 1/2020 |
| EP | 2685750 | A1 | 1/2014 |
| EP | 2541402 | B1 | 1/2019 |
| KR | 10 2017 0035294 | A | 3/2017 |
| WO | 2014113882 | A1 | 7/2014 |
| WO | 2016144375 | A1 | 9/2016 |
| WO | 2017147525 | A1 | 8/2017 |

OTHER PUBLICATIONS

International Search Report and Written Opinion for PCT Patent Application No. PCT/US2022/040928 dated Nov. 29, 2022, 7 pages.

Towards Resource-aware Business Process development in the Cloud, Hachicha et al, Apr. 2015 (Year: 2015).

Notice of Allowance dated Feb. 7, 2023 for U.S. Appl. No. 17/890,798.

Non-Final Office Action dated Aug. 28, 2024 for U.S. Appl. No. 17/891,399, 32 pp.

Non-Final Office Action dated Sep. 11, 2024 for U.S. Appl. No. 17/891,392.

Non-Final Office Action dated Nov. 7, 2024 for U.S. Appl. No. 18/438,775, 33 pp.

Non-Final Office Action dated Nov. 18, 2024 for U.S. Appl. No. 17/890,879, 38 pp.

Non-Final Office Action dated Nov. 14, 2024 for U.S. Appl. No. 17/890,853, 52 pp.

Final Office Action dated Feb. 12, 2025 for U.S. Appl. No. 17/891,357, 54 pp.

Notice of Allowance dated Feb. 26, 2025 for U.S. Appl. No. 17/890,853.

Extended European Search Report for European Patent Application No. EP22859234 dated Apr. 11, 2025, 10 pages.

Notice of Allowance dated Jun. 18, 2025 for U.S. Appl. No. 17/891,370, 34 pp.

Non-Final Office Action dated Jun. 23, 2025 for U.S. Appl. No. 17/891,357, 24 pp.

Notice of Allowance dated Nov. 18, 2025 for U.S. Appl. No. 18/441,519, 73 pp.

Final Office Action dated Jan. 24, 2025 for U.S. Appl. No. 17/891,370, 56 pp.

Notice of Allowance dated Jan. 29, 2025 for U.S. Appl. No. 17/891,392.

* cited by examiner

LIMITING SHARING OF VISUAL DATA

PRIORITY CLAIM

This application claims priority to U.S. Provisional Patent Application No. 63/553,387, titled "LIMITING SHARING OF VISUAL DATA," filed on Feb. 14, 2024, the entire disclosure of which is incorporated herein by reference.

TECHNICAL FIELD

Embodiments pertain to computer architecture. Some embodiments relate to artificial intelligence. Some embodiments relate to limiting sharing of visual data.

BACKGROUND

Visual output of a computer may be accessed, for example, by processes, such as a display output process, an employee monitoring software process or by a screen sharing processes (e.g., in video conferencing software). Techniques for limiting the visual data that is accessed by one or more of these processes may be desirable.

DETAILED DESCRIPTION

Figure 1:
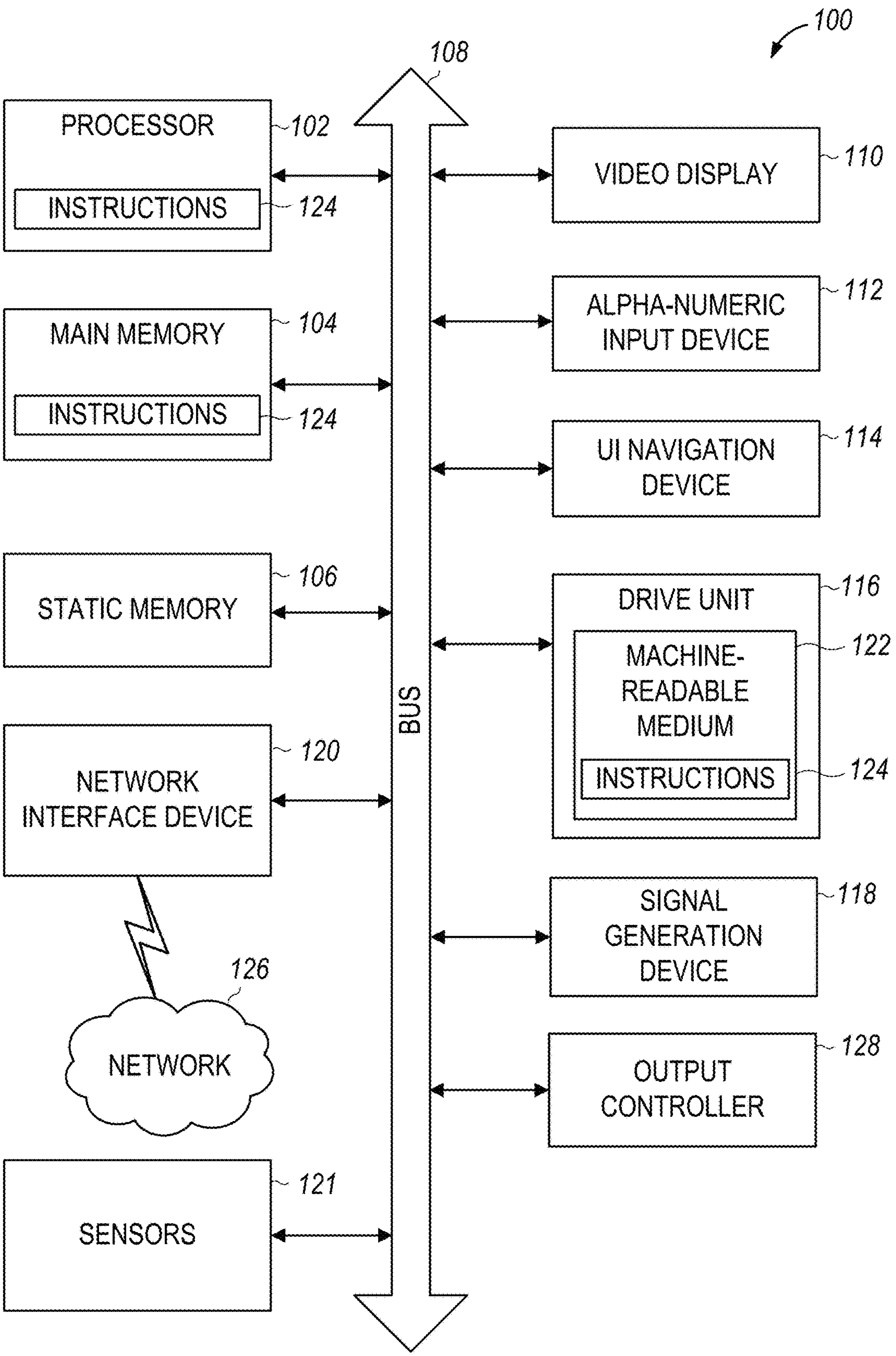
FIG. 1 is a block diagram of a computing machine, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A computing machine generates visual output. For example, the visual output may include one or more windows displayed on a display unit, such as a screen. All or a portion of the visual output may be captured by a capturing process, such as a process for displaying the visual output on the display unit, a monitoring software (e.g., employee monitoring software) process or by a screen sharing processes (e.g., in video conferencing software). Techniques for limiting the visual data that is accessed by one or more of these processes may be desirable. Some implementations disclosed herein are directed to limiting the sharing of visual data with the capturing process that captures computing data generated by the computing machine.

According to some implementations, a low-level engine of the computing machine accesses visual data associated with a window. The low-level engine may be a low-level engine of an operating system. For example, the low-level engine may include at lease one of a kernel, a driver, or a desktop window manager (DWM). The low-level engine receives a request for computing data associated with a capturing process. The low-level engine generates computing data for provision to the capturing process responsive to the request. Generating the computing data may include determining whether to include the visual data in the computing data based on an identifier of the window and an identifier of the capturing process. The low-level engine provides the computing data to the capturing process.

In some cases, the low-level engine determines to include the visual data (associated with the window) in the computing data (for provision to the capturing process) based on stored indication that information of the window is approved for transmission to the capturing process. The stored indication may be associated with an application of the window or content within the window. The stored indication may be stored within a security policy of the computing machine.

Alternatively, the low-level engine may determine not to include the visual data in the computing data based on a lack of a stored indication that the information of the window is approved for transmission to the capturing process. If the visual data is not included in the computing data, the computing data may include, in place of the visual data, a preset visual signal. The preset visual signal may be an overlay, a blur, an obscuring, or a part of a preset image (e.g., a company logo).

As used herein, the term "window" may include, among other things, a region (e.g., a rectangular region) of a display unit that displays content associated with a running application or process. The term "window" may include, among other things, a software object representing the visible portion of an application. A window may have properties such as a position, a size, a visibility, and content. Windows may be programmed to create other windows, manage other windows, and/or interact with other windows. A graphical user interface (GUI) or other visual output may incorporate overlapping windows or windows that fully or partially occlude other windows. A window may include at least one of a virtual desktop or a visual output of an application. As used herein, a window may be implemented in any operating system and is not limited to Microsoft Windows® operating systems.

As used herein, the term "kernel" may include, among other things, an engine of an operating system that acts as a bridge between the physical hardware and the software applications running on the physical hardware. A kernel may perform process management, which include creating and scheduling processes, handling memory allocation, and dividing memory resources between software programs running in parallel. A kernel may communicate with deice drivers of devices such as a printer, a disk, or a network card. A kernel may manage how data of a file system is stored, accessed, and modified on storage devices. A kernel may handle inter-process communication. A kernel may provide security services, such as access control to protect the computing machine from unauthorized access.

As used herein the term "driver" may include, among other things, an engine of an operating system that provides for communication between the operating system and a specific hardware device (e.g., a display device, a printer, a keyboard, a mouse, or a network card). The driver may act as a bridge connecting software of the computing machine to the physical realm of the specific hardware device. Software running on the computing machine (e.g., word processing software) generates instructions for the operating system (e.g., to display certain data or to print certain data). The operating system transmits these instructions to various drivers (e.g., the display driver or the printer driver) and the various drivers cause the hardware devices to perform the associated tasks. Furthermore, hardware may be used to generate instructions. For example, a user may move or click the mouse or may type using the keyboard. The moving or clicking of the mouse or the typing using the keyboard are detected by the associated drivers (e.g., the mouse driver or the keyboard driver) and the associated drivers provide data based on the operation of the hardware to the operating system and the software running thereon. As a result, the software (e.g., the word processing software) is able to respond to the moving or clicking of the mouse or the typing using the keyboard.

As used herein the phrase "desktop window manager" may include, among other things, an engine of the operating system responsible for managing the display of windows and visual effects associated with windows. The desktop window manager may orchestrate how windows appear and interact with one another on the display device. The desktop window manager may perform the function of window positioning. The desktop window manager may track the size and location of every open window, ensuring that they overlap and stack according to the functionality of the operating system or the user actions. The desktop window manager may create an off-screen buffer for each window and blend the buffers together (e.g., using a technique known as composting) into a single final image for display at the display device. Examples of desktop window managers include Windows Desktop Window Manager® developed by Microsoft Corporation for Windows Vista® and some other versions of the Windows® operating system, GNOME Mutter, which is the default window manager of the GNOME desktop environment in Linux, or KWin, which is the default window manager for the KDE Plasma desktop environment in Linux. In some cases, the desktop window manager is configured to draw at least one of a graphical user interface of a desktop, a wallpaper, an icon, the window, or a login screen.

Some aspects of the disclosed technology include the use of monitoring technology, such as employee monitoring software. It should be noted that the monitoring technology is used with the affirmative consent and knowledge of the user. The user may be notified, for example, by persistent on-screen notifications or periodic (e.g., daily, weekly, or monthly) notifications by email or other messaging services that the monitoring technology is being used to monitor their activity on a device provided to them by a third party (e.g., on an employer-provided computing machine).

Aspects of the present technology may be implemented as part of a computer system. The computer system may be one physical machine, or may be distributed among multiple physical machines, such as by role or function, or by process thread in the case of a cloud computing distributed model. In various embodiments, aspects of the technology may be configured to run in virtual machines that in turn are executed on one or more physical machines. It will be understood by persons of skill in the art that features of the technology may be realized by a variety of different suitable machine implementations.

The system includes various engines, each of which is constructed, programmed, configured, or otherwise adapted, to carry out a function or set of functions. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

Considering examples in which engines are temporarily configured, each of the engines may be instantiated at different moments in time. For example, where the engines comprise a general-purpose hardware processor core configured using software, the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

As used herein, the term "model" encompasses its plain and ordinary meaning. A model may include, among other things, one or more engines which receive an input and compute an output based on the input. The output may be a classification. For example, an image file may be classified as depicting a cat or not depicting a cat. Alternatively, the image file may be assigned a numeric score indicating a likelihood whether the image file depicts the cat, and image files with a score exceeding a threshold (e.g., 0.9 or 0.95) may be determined to depict the cat.

This document may reference a specific number of things (e.g., "six mobile devices"). Unless explicitly set forth otherwise, the numbers provided are examples only and may be replaced with any positive integer, integer or real number, as would make sense for a given situation. For example, "six mobile devices" may, in alternative embodiments, include any positive integer number of mobile devices. Unless otherwise mentioned, an object referred to in singular form (e.g., "a computer" or "the computer") may include one or multiple objects (e.g., "the computer" may refer to one or multiple computers).

FIG. 1 illustrates a circuit block diagram of a computing machine 100 in accordance with some embodiments. In some embodiments, components of the computing machine 100 may store or be integrated into other components shown in the circuit block diagram of FIG. 1. For example, portions of the computing machine 100 may reside in the processor 102 and may be referred to as "processing circuitry." Processing circuitry may include processing hardware, for example, one or more central processing units (CPUs), one or more graphics processing units (GPUs), and the like. In alternative embodiments, the computing machine 100 may operate as a standalone device or may be connected (e.g., networked) to other computers. In a networked deployment, the computing machine 100 may operate in the capacity of a server, a client, or both in server-client network environments. In an example, the computing machine 100 may act as a peer machine in peer-to-peer (P2P) (or other distributed) network environment. In this document, the phrases P2P, device-to-device (D2D) and sidelink may be used interchangeably. The computing machine 100 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 100 may include a hardware processor 102 (e.g., a central processing unit (CPU), a GPU, a hardware processor core, or any combination thereof), a main memory 104 and a static memory 106, some or all of which may communicate with each other via an interlink (e.g., bus) 108. Although not shown, the main memory 104 may contain any or all of removable storage and non-removable storage, volatile memory or non-volatile memory. The computing machine 100 may further include a video display unit 110 (or other display unit), an alphanumeric input device 112 (e.g., a keyboard), and a user interface (UI) navigation device 114 (e.g., a mouse). In an example, the display unit 110, input device 112 and UI navigation device 114 may be a touch screen display. The computing machine 100 may additionally include a storage device (e.g., drive unit) 116, a signal generation device 118 (e.g., a speaker), a network interface device 120, and one or more sensors 121, such as a global positioning system (GPS) sensor, compass, accelerometer, or other sensor. The computing machine 100 may include an output controller 128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 116 (e.g., a storage device) may include a machine readable medium 122 on which is stored one or more sets of data structures or instructions 124 (e.g., software) embodying or utilized by any one or more of the techniques or functions described herein. The instructions 124 may also reside, completely or at least partially, within the main memory 104, within static memory 106, or within the hardware processor 102 during execution thereof by the computing machine 100. In an example, one or any combination of the hardware processor 102, the main memory 104, the static memory 106, or the storage device 116 may constitute machine readable media.

While the machine readable medium 122 is illustrated as a single medium, the term "machine readable medium" may include a single medium or multiple media (e.g., a centralized or distributed database, and/or associated caches and servers) configured to store the one or more instructions 124.

The term "machine readable medium" may include any medium that is capable of storing, encoding, or carrying instructions for execution by the computing machine 100 and that cause the computing machine 100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 124 may further be transmitted or received over a communications network 126 using a transmission medium via the network interface device 120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 120 may include one or more physical jacks (e.g., Ethernet, coaxial, or phone jacks) or one or more antennas to connect to the communications network 126.

Figure 2:
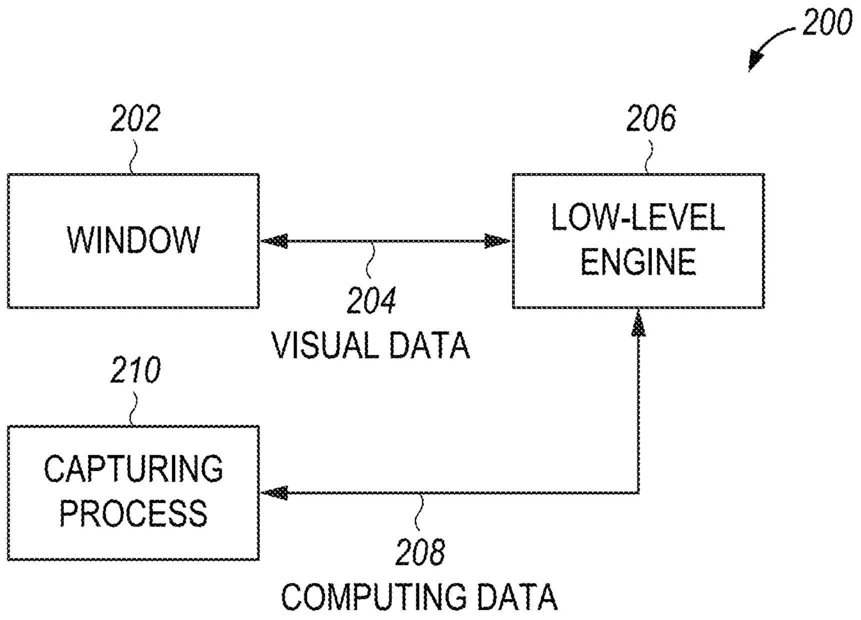
FIG. 2 is a block diagram of a first system for sharing visual data, in accordance with some embodiments.

FIG. 2 is a block diagram of a system 200 for sharing visual data, in accordance with some embodiments. The system 200 may be implemented at the computing machine 100, with data being stored in at least one of the main memory 104, the static memory 106, the drive unit 116, or other storage locations, and operations being performed by the processor 102 and/or other processors.

As shown in FIG. 2, a window 202 is associated with output of visual data 204 (e.g., for display via the video display 110). The visual data 204 is provided to a low-level engine 206. The low-level engine 206 may be associated with an operating system of the computing machine 100 and may be at least one of a kernel, a driver, or a desktop window manager. The low-level engine 206 receives a request for computing data 208 from a capturing process 210. The capturing process 210 may be a process that captures computing data 208 of the system 200. For example, the capturing process 210 may be a process that captures screen sharing data for a video conferencing application or a screen recording application. In another example, the capturing process 210 may be a monitoring process associated with employee monitoring software, parental monitoring software, or other monitoring software.

The visual data 204 may include at least one of a graphical user interface of a desktop, virtual display data, screenshot data, or screen display data. The visual data 204 may be represented, in memory, using various techniques. For example, the visual data 204 may be represented using at least one of virtual desktop data, full screen visual data, partial screen visual data associated with a range of coordinates of a screen, or delta visual data indicating a change of imagery on the screen.

The computing data 208 that is requested by and/or provided to the capturing process 210 may include any data associated with use of the system 200. For example, the computing data 208 may include visual output data displayed on the video display 110. In some cases, the computing data 208 may include at least one of network access data associated with accessing the network 126 via the network interface device 120, data captured by sensors 121 (e.g., a camera or a microphone), data obtained from the alpha-numeric input device 112 or the UI navigation device 114, a signal (e.g., an audio signal) generated by the signal generation device 118, or output associated with the output controller 128.

The low-level engine 206 generates the computing data 208 for provision to the capturing process 210 responsive to the request. In generating the computing data 208, the low-level engine 206 determines whether to include the visual data 204 of the window 202 in the computing data 208 based on an identifier of the window 202 and an identifier of the capturing process 210. The identifier of the window 202 may be based on at least one of a parent of the window 202, a process associated with the window 202, or an application associated with the window 202. The identifier of the window 202 may include at least one of an identifier of an application being executed in the window 202, an identifier of an application generating the window 202, or an identifier of a process associated with the window 202. The identifier of the process associated with the window 202 may be at least one of a process name, a location of the process, or a digital signature. The identifier of the capturing process 210 may include at least one of a digital signature, a process name, process identifier, or location where the capturing process is stored. The low-level engine 206 provides the computing data 208 to the capturing process 210. In some cases, the low-level engine 206 composes the computing data 208.

Figure 3:
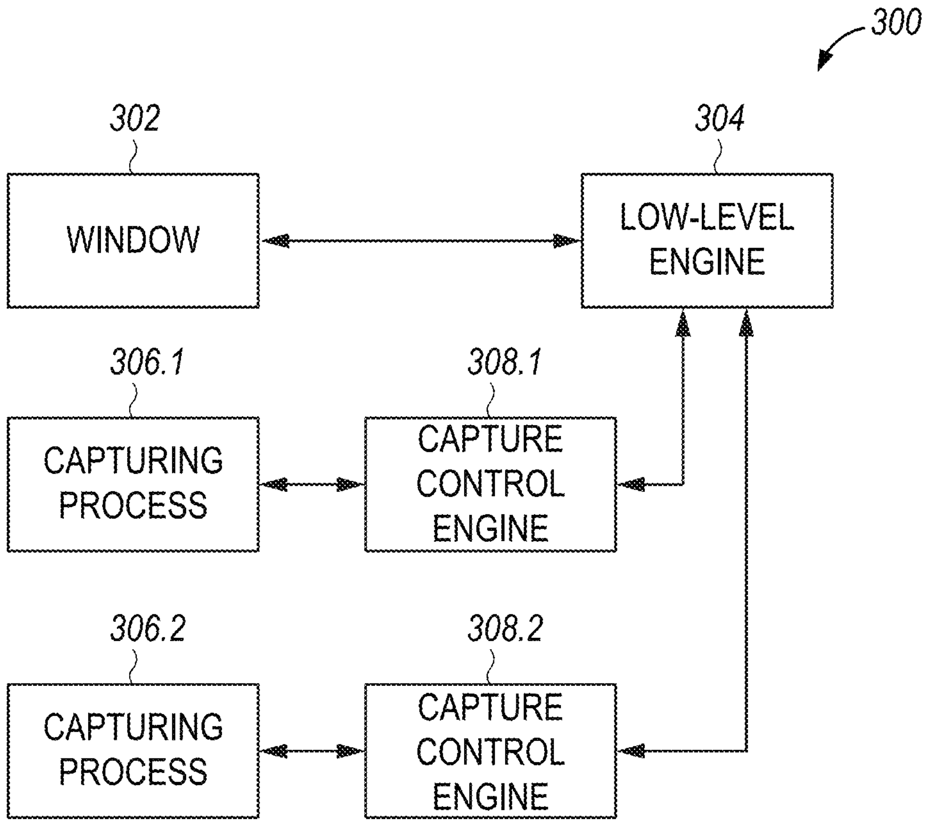
FIG. 3 is a block diagram of a second system for sharing visual data, in accordance with some embodiments.

FIG. 3 is a block diagram of a system 300 for sharing visual data, in accordance with some embodiments. The system 300 may correspond to the system 200.

As shown, the system 300 includes a window 302, which may correspond to the window 202. The system 300 includes a low-level engine 304, which may correspond to the low-level engine 206. The system 300 includes two capturing processes 306.1-2, each of which may correspond to the capturing process 210. The two capturing processes 306.1-2 are separate capturing processes. For example, the capturing process 306.1 may be associated with a monitoring application and the capturing process 306.2 may be associated with a video calling application. As shown, the capturing process 306.1 has a capture control engine 308.1 and the capturing process 306.2 has a capture control engine 308.2. The capture control engine 308.1 intercepts data communications from the low-level engine 304 to the capturing process 306.1 and modifies the visual data (e.g., the visual data 204) being communicated prior to its use by the capturing process 306.1. For example, the capture control engine 308.1 may enforce a security policy to ensure that certain data (e.g., as determined based on an identifier of the window 302) is not used by the capturing process 306.1. For example, if the system 300 segregates business data and personal data, the capture control engine 308.1 may ensure that business data is shared with the capturing process 306.1, while personal data is not shared with the capturing process 306.1. If the window 302 includes business data, its content is shared, while if the window 302 includes personal data, its content is not shared.

As a result of the separation of the capture control engines 308.1 and 308.2, as illustrated in FIG. 3, different visual data may be captured by the capturing process 306.1 and the capturing process 306.2. For example, the capturing process 306.1 may be associated with a monitoring application for an employee of a business and the capturing process 306.2 may be associated with screen sharing in a video calling application for personal use. Thus, the capturing process 306.1 (e.g., the monitoring application) may be granted access to the visual data in the window 302 if it is associated with business use (e.g., a word processing document that include business content) while the capturing process 306.1 may be denied access to the visual data in the window 302 if it is associated with personal use (e.g., a personal photograph). In contrast, the capturing process 306.2 (e.g., the video calling application) may be denied access to the visual data in the window 302 if it is associated with business use (e.g., the word processing document that include business content) while the capturing process 306.2 may be granted access to the visual data in the window 302 if it is associated with personal use (e.g., the personal photograph). As a result, the user of the system 300 is able to maintain privacy from the monitoring application in their personal computing data while sharing their business computing data. In addition, the user is able to share their personal computing data with the video calling application, while the business computing data is not inadvertently shared (e.g., if the user leaves one or more of their business windows open during a personal video call that includes screen sharing).

Figure 4:
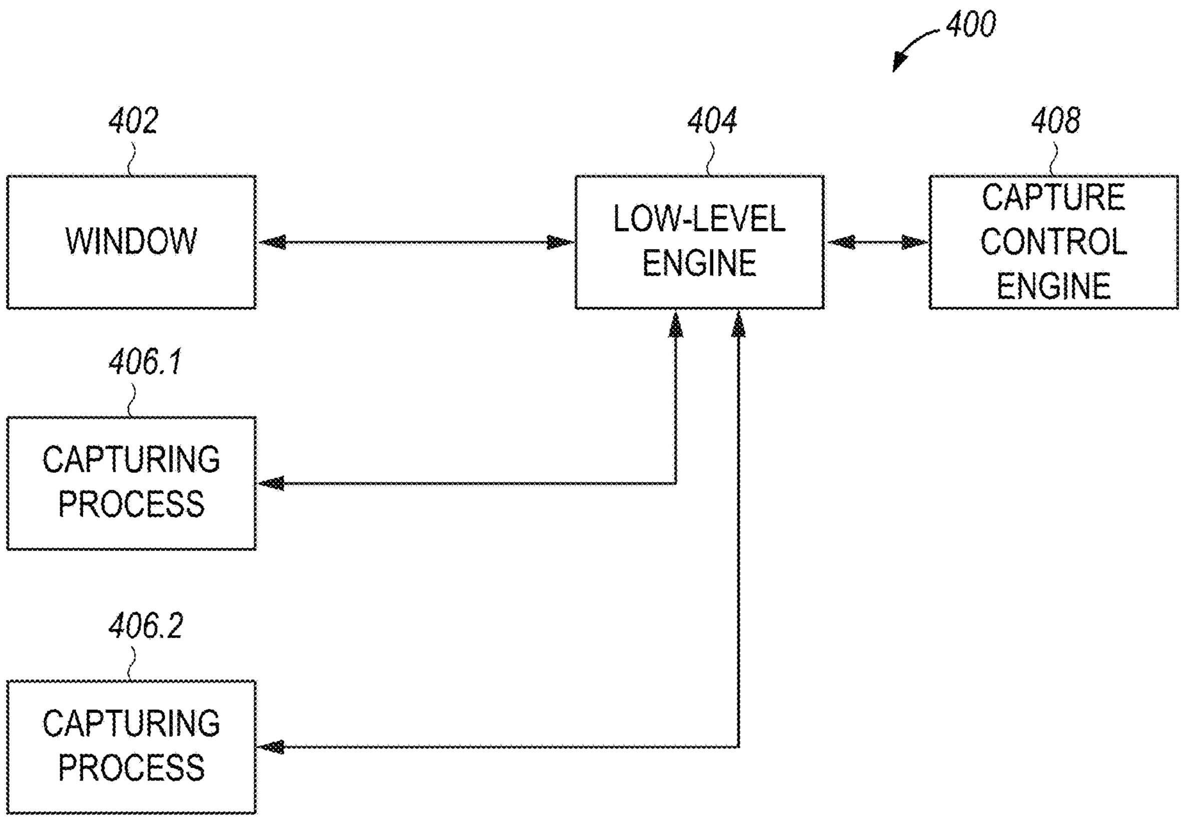
FIG. 4 is a block diagram of a third system for sharing visual data, in accordance with some embodiments.

FIG. 4 is a block diagram of a system 400 for sharing visual data, in accordance with some embodiments. The system 400 may correspond to the system 200.

As shown, the system 400 includes a window 402, which may correspond to the window 202. The system 400 includes a low-level engine 404, which may correspond to the low-level engine 206. The system 400 includes two capturing processes 406.1-2, each of which may correspond to the capturing process 210. The two capturing processes 406.1-2 are separate capturing processes (similar to the two capturing processes 306.1-2 of FIG. 3). For example, the capturing process 406.1 may be associated with a monitoring application and the capturing process 406.2 may be associated with a video calling application. As shown, a capture control engine 408 is coupled with the low-level engine 404. The capture control engine 408 controls data transmission from the low-level engine 404 to the capturing processes 406.1-2. As a result, the capture control engine 408 performs functions similar to those of the capture control engines 308.1-2 of FIG. 3. However, in FIG. 4, the same capture control engine 408 performs the control of the data transmission for both capturing processes 406.1 and 406.2. While two capturing processes 406.1-2 are illustrated, it should be noted that there may be other numbers of capturing processes the visual data capture of which is controlled by the capture control engine 408.

The capture control engine 408 controls data communications from the low-level engine 404 to the capturing processes 406.1-2 and modifies the visual data (e.g., the visual data 204) being communicated prior to its transmission to the capturing processes 406.1-2. It should be noted that the capture control engine 408 may allow for different rules to be applied for data transmission to the capturing process 406.1 and to the capturing process 406.2. For example, the capture control engine 408 may enforce a security policy to ensure that certain data (e.g., as determined based on an identifier of the window 402) is not used by the capturing process 406.1, and certain other data is not used by the capturing process 406.2. In one example use case, the capturing process 406.1 is associated with business monitoring software and the capturing process 406.2 is associated with personal video conferencing software. The capture control engine 408 ensures that business data (e.g., windows displaying business files) are transmitted to the capturing process 406.1 but not to the capturing process 406.2 The capture control process further ensures that personal data (e.g., windows displaying personal files) are transmitted to the capturing process 406.2 but not to the capturing process 406.1. As a result, a business is able to monitor use of business files but not use of personal files. Conversely, the personal video calling software is able to share, via screen sharing, windows with personal files but not windows with business files, with remote participants in the video conference.

It should be noted that the capture control engine 408 of FIG. 4 performs functionality similar to the capture control engines 308.1-2 of FIG. 3. However, the capture control engine 408 is connected to the low-level engine and might not be directly connected to the capturing processes 406.1-2. Furthermore, FIG. 3 has a separate capture control engine 308.1 and 308.2 for each capturing process 306.1 and 306.2, respectively. In contrast, in FIG. 4, the capture control engine 408 is shared by multiple capturing processes 406.1-2.

Figure 5:
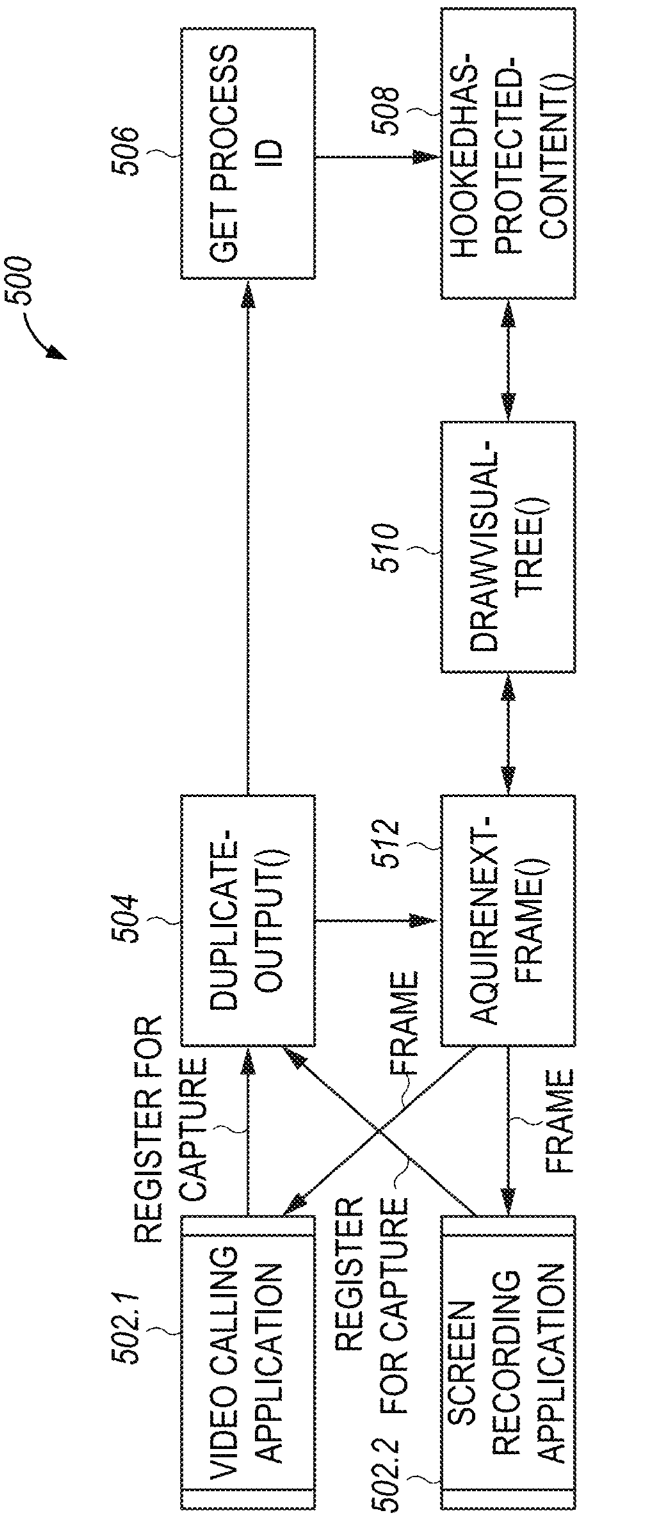
FIG. 5 is a block diagram of a system for limiting sharing of visual data using desktop duplication.

FIG. 5 is a block diagram of a system 500 for limiting sharing of visual data using desktop duplication. The system 500 may correspond to the system 200. As shown, the system 500 includes a video calling applications 502.1 and a screen recording application 502.2. Each of the video calling applications 502.1 and the screen recording application 502.2 may correspond to the capturing process 210.

As illustrated, the video calling application 502.1 registers for capture with Duplicate Output 504. The screen recording application 502.2 registers for capture with Duplicate Output 504. Duplicate Output 504 prompts Get Process ID 506 to obtain process IDs. Get Process ID 506 provides output to Hooked Has Protected Content 508. Whether a window that is displayed on the display device (e.g., the window 202) has protected content may be determined based on the process identifier (PID) and/or window identifier of the capturing process (e.g., the video calling application 502.1 or the screen recording application 502.2) and/or based on the PID and/or window identifier of the running process (that generates the visual data in the window). The output of Duplicate Output 504 is the location from which the PID of the capturing process (e.g., the video calling application 502.1 or the screen recording application 502.2) is obtained. The output of Hooked Has Protected Content 508 is used by Draw Visual Tree 510 to draw a visual tree for output to the video calling application 502.1 or the screen recording application 502.2. At Acquire Next Frame 512, the next frame is generated based on the output of Draw Visual Tree 510 and the output of Duplicate Output 504. The frame acquired by Acquire Next Frame 512 is provided to the video calling application 502.1 or the screen recording application 502.2.

It should be noted that the low-level engine 206 may include at least one of Duplicate Output 504, Get Process ID 506, Hooked Has Protected Content 508, Draw Visual Tree 510, or Acquire Next Frame 512. Duplicate Output 504, Get Process ID 506, Hooked Has Protected Content 508, Draw Visual Tree 510, or Acquire Next Frame 512 may be implemented using software, hardware, or a combination of software and hardware.

Figure 6:
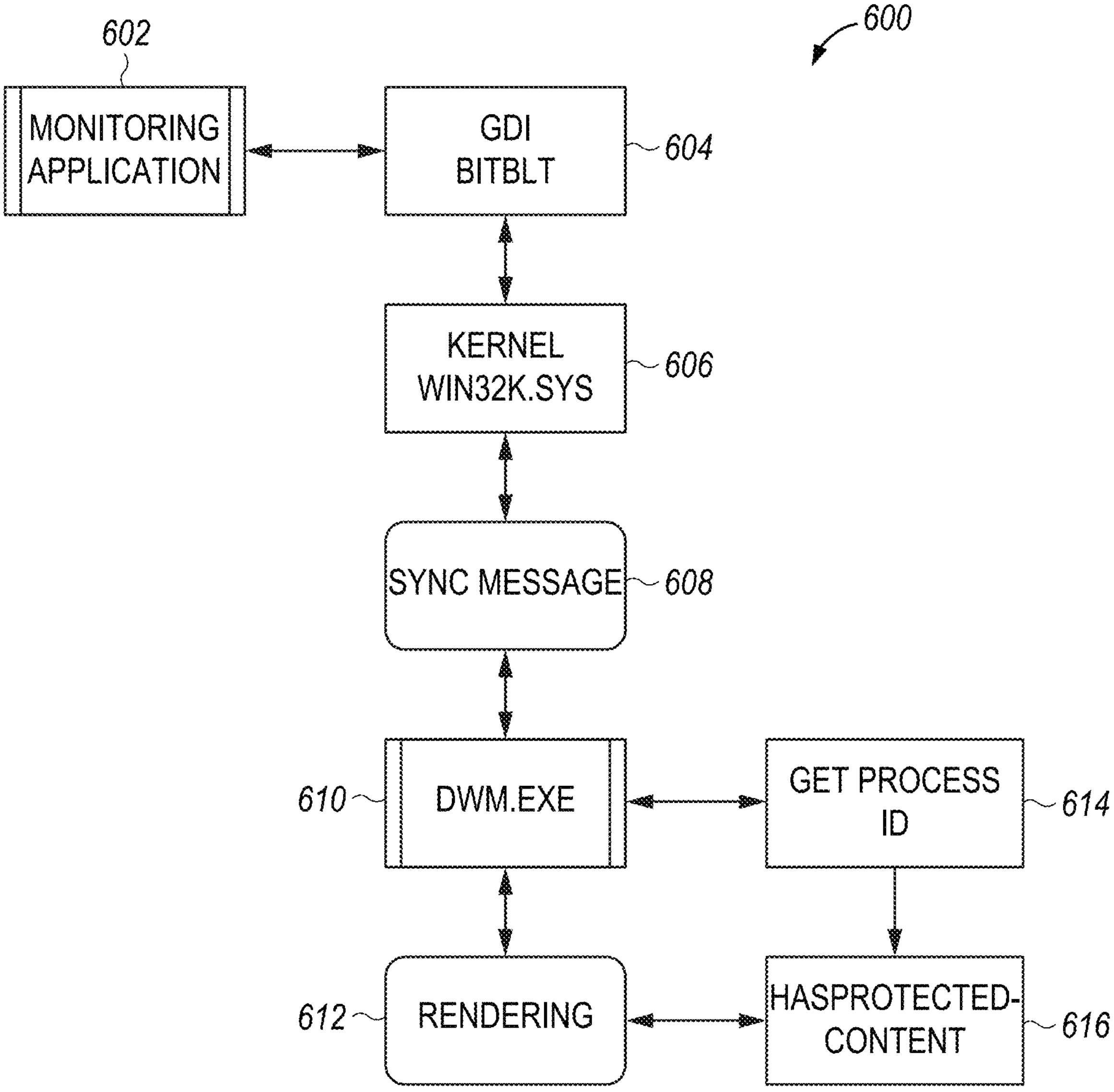
FIG. 6 is a block diagram of a system for limiting sharing of visual data using a graphical device interface.

FIG. 6 is a block diagram of a system 600 for limiting sharing of visual data using a graphical device interface. The system 600 may correspond to the system 200. As shown, the system 600 includes a monitoring application 602. The monitoring application 602 may correspond to the capturing process 210.

As shown, the monitoring application 602 communicates with a Graphical Device Interface (GDI) Bit Block Transfer (Bitblt) 604. The GDI is an application programming interface (API) for drawing lines, shapes, text, and other visual outputs to the display device, the printer, or other processes (e.g., the monitoring application 602) that obtain visual output. The Bitblt is a function within the GDI API that allows copying of a rectangular box (or other shape) of data from one location (the source) to another location (the destination). This allows the moving or copying of visual data.

The GDI Bitblt 604 communicates with the Kernel win32k.sys 606. The Kernel win32k.sys 606 transmits, to the GDI Bitblt 604, at least one of a source memory address of pixels, a destination memory address of pixels, rectangular dimensions of the data blocks of the pixels, color formats of the pixels, and Bitblt operation flags instructing the GDI Bitblt 604 how to handle color blending or transparency.

The Kernel win32k.sys 606 receives a sync message 608 (or multiple sync messages) from the desktop window manager (Dwm.exe) 610. The sync message 608 include updates to content or positioning of windows (e.g., movement or animation of windows) and instruct the Kernel win32k.sys on how to synchronize the software-related visual changes with the underlying graphics hardware. The Kernel win32k.sys 606 receives the sync message 608 and extracts vital information like which windows need updating, their new positions, and any effects to apply. The Kernel win32k.sys 606 then utilizes its understanding of the hardware and graphics pipeline to efficiently translate these instructions into commands for the graphics card and display (for output to the GDI Bitblt 604).

The Dwm.exe 610 performs rendering 612. The rendering 612 is based on a process ID for each process generating window content and whether that process associated with protected content. The Dwm.exe 610 obtains the process ID using Get Process ID 614 and determines whether the process ID is associated with protected content using Has Protected Content 616.

It should be noted that the low-level engine 206 may include at least one of the GDI Bitblt 604, the Kernel win32k.sys 606, the sync message 610, the Dwm.exe 610, the rendering 612, the Get Process ID 614, or the Has Protected Content 616. The GDI Bitblt 604, the Kernel win32k.sys 606, the sync message 610, the Dwm.exe 610, the rendering 612, the Get Process ID 614, or the Has Protected Content 616 may be implemented using software, hardware, or a combination of software and hardware.

Figure 7:
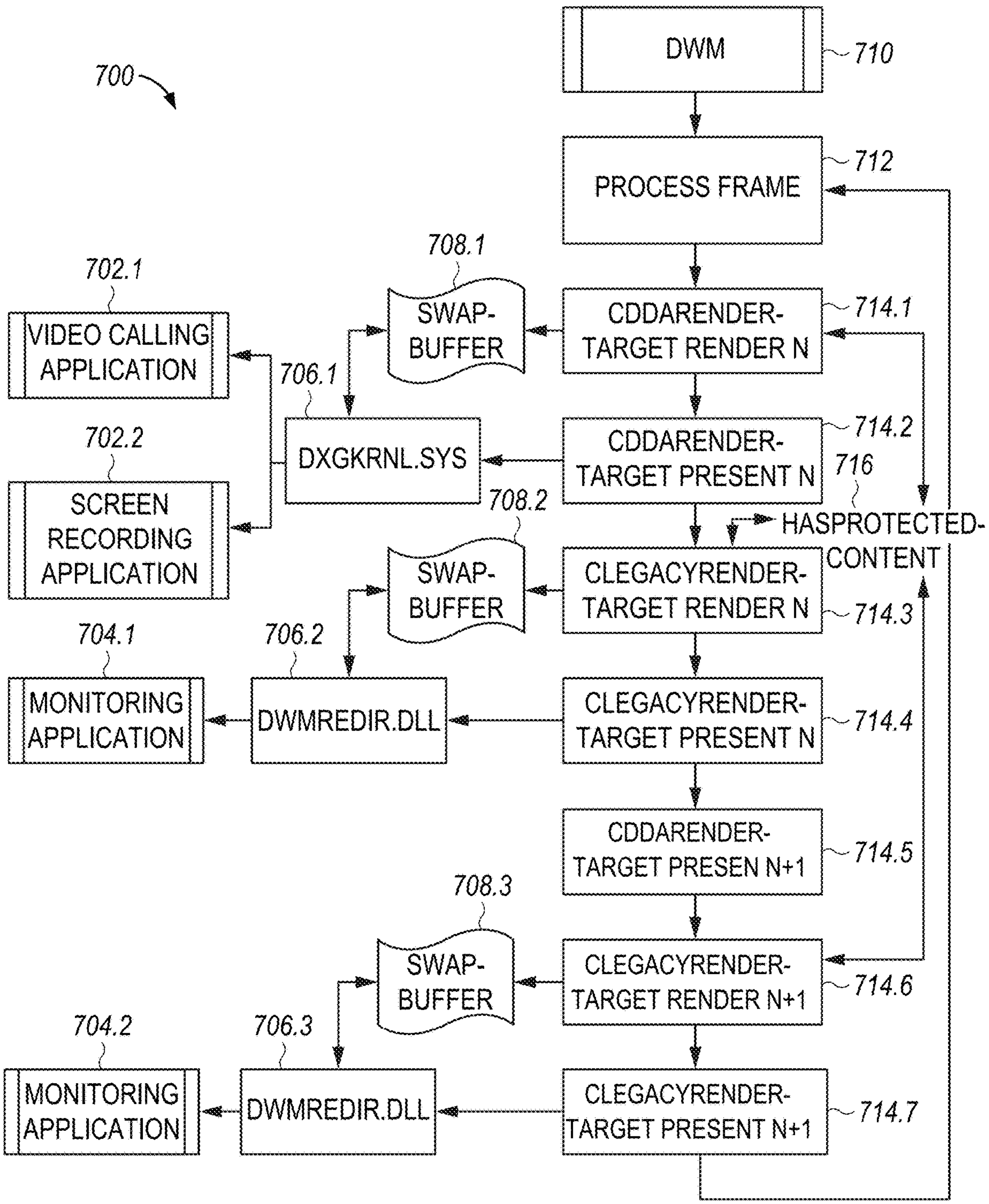
FIG. 7 is a block diagram of a system for limiting sharing of visual data using a graphical device interface and desktop duplication.

FIG. 7 is a block diagram of a system 700 for limiting sharing of visual data using a graphical device interface and desktop duplication. The system 700 may correspond to the system 200. As shown, the system 700 includes a video calling applications 702.1, a screen recording application 702.2, and two monitoring applications 704.1-2. Each of the video calling application 702.1, the screen recording application 702.2, and/or the two monitoring applications 704.1-2 may correspond to the capturing process 210.

As shown, the video calling application 702.1 and/or the screen recording application 702.2 receive visual data (e.g., screen sharing data) from Dxgkrnl.sys 706.1, which is a Windows® kernel graphics driver. The output from Dxgkrnl.sys 706.1 is transmitted or displayed via the video calling application 702.1 and/or the screen recording application 702.2.

Dxgkrnl.sys 706.1 receives rendered image data from a swap buffer 708.1 and rendered image data from a CDDARenderTarget Present n 714.2. Dxgkrnl.sys 706.1 outputs rendered image data to the video calling application 702.1 for screen sharing and/or to the screen recording application 702.2. The swap buffer 708.1 receives, as input, rendered image data from CDDARenderTarget Render n 714.1 and outputs rendered image data to Dxgkrnl.sys 706.1 for transmission or display via the video calling application 702.1 and/or the screen recording application 702.2.

The CDDARenderTarget Render n 714.1 receives, as input, graphics data in a process frame 712 output by the DWM 710. The CDDARenderTarget Render n 714.1 Outputs a rendered image to the swap buffer 708.1 and outputs the rendered image to the CDDARenderTarget Present n 714.2. The CDDARenderTarget Present n 714.2 outputs rendered image data (e.g., in a format for presentation) for processing by Dxgkrnl.sys 706.1.

The CDDARenderTarget Render n 714.1 further uses HasProtectedContent 716 to determine whether the process frame 712 includes content that is not to be shared to the video calling applications 702.1 and/or the screen recording application 702.2, and adjusts the output provided to the swap buffer 708.1 and/or to the CDDARenderTarget Present n 714.2 accordingly.

It should be noted that CDDARenderTargets Render n 714.1 and the CDDARenderTarget Present n 714.2 act as central hubs, receiving graphics data from rendering pipelines and providing outputs to both the swap buffer 708.1 and Dxgkrnl.sys 706.1. The swap buffer 708.1 may be responsible for presenting the rendered image to at least one of the display device, the video calling application 702.1, and/or the screen recording application 702.2 using Dxgkrnl.sys 706.1. The Dxgkrnl.sys 706.1 handles the presentation on the display device and provides additional output paths for screen sharing to the video calling application 702.1 and/or the screen recording application 702.2. Multiple techniques for the Dxgkrnl.sys 706.1 to interact with the video calling application 702.1 and/or the screen recording application 702.2 may be used. For example, there may be a dedicated screen capture API and/or a virtual display driver may be involved.

As further illustrated in FIG. 7, the output of CDDARenderTarget Present n 714.2 is provided to CLegacyRenderTarget Render n 714.3. CLegacyRenderTarget Render n 714.3 further accesses HasProtectedContent 716 to determine whether the content of the process frame 712 includes content that is not to be shared with the monitoring application 704.1. For example, the content that is not to be shared with the monitoring applications 704.1-2 may be personal content (as opposed to business content) or content stored or running outside of a supervised zone of the computing machine that does not access content of the supervised zone of the computing machine.

The output of CLegacyRenderTarget Render n 714.3 is provided to CLegacyRenderTarget Present n 714.4. CLegacyRenderTarget Render n 714.3 provides output to a swap buffer 708.2. CLegacyRenderTarget Present n 714.4 and the swap buffer 708.2 provide output to Dwmredir.dll (desktop window manager redirection dynamic link library) 706.2. Dwmredir.dll 706.2 provides output to the monitoring application 704.1.

CLegacyRenderTarget Render n 714.3 and CLegacyRenderTarget Present n 714.4 may operate differently from CDDARenderTarget Render n 714.1 and CDDARenderTarget Present n 714.2. For example, the CDDARenderTargets and the CLegacyRenderTargets may be associated with different rendering APIs, different internal components, different rendering stages, or different functionality. Specifically, while the CDDARenderTargets generate visual data for the video calling application 702.1 and/or the screen recording application 702.2, the CLegacyRenderTargets generate visual data for the monitoring application 704.1.

The swap buffer 708.2 functions similarly to the swap buffer 708.1. However, the swap buffer 708.2 receives input from CLegacyRenderTarget Render n 714.3 instead of CDDARenderTarget Render n 714.1. The swap buffer 708.2 outputs to Dwmredir.dll 706.2 instead of Dxgkrnl.sys 706.1.

Dwmredir.dll 706.2 receives input from the swap buffer 708.2 and CLegacyRenderTarget Present n 714.4. The swap buffer 708.2 temporarily stores rendered frames from graphics applications before sending them out to the display device or the monitoring application 714.1. Dwmredir.dll 706.2 can access the content of the swap buffer 708.2, essentially capturing a snapshot of what is shown on the display device. CLegacyRenderTarget Present n 714.4 is an internal component and/or an API related to rendering methods.

Dwmredir.dll 706.2 acts as a bridge, potentially providing captured display device content or other relevant information to the monitoring application 704.1. The monitoring application 704.1 may use these data for various purposes, such as recording activity, tracking productivity, or enforcing security policies.

As further illustrated in FIG. 7, CLegacyRenderTarget Present n 714.4 outputs to CDDARenderTarget Render/Present n+1 714.5. CDDARenderTarget Render/Present n+1 714.5 outputs to CLegacyRenderTarget Render n+1 714.6. CLegacyRenderTarget Render n+1 714.6 outputs to CLegacyRenderTarget Present n+1 714.7. CLegacyRenderTarget Present n+1 714.7 outputs to the process frame 712. CLegacyRenderTarget Render n+1 714.6 accesses HasProtectedContent 716 to determine whether the content of the process frame 712 includes content that is not to be shared with the monitoring application 704.2.

CLegacyRenderTarget Render n+1 714.6 outputs to a swap buffer 708.3. CLegacyRenderTarget Present n+1 714.7 outputs to Dwmredir.dll 706.3. The swap buffer 708.3 outputs to Dwmredir.dll 706.3. Dwmredir.dll 706.3 outputs to the monitoring application 704.2. The functionality of the swap buffer 708.3 mirrors that of the swap buffer 708.2. The functionality of Dwmredir.dll 706.3 mirrors that of Dwmredir.dll 706.2.

Figure 8:
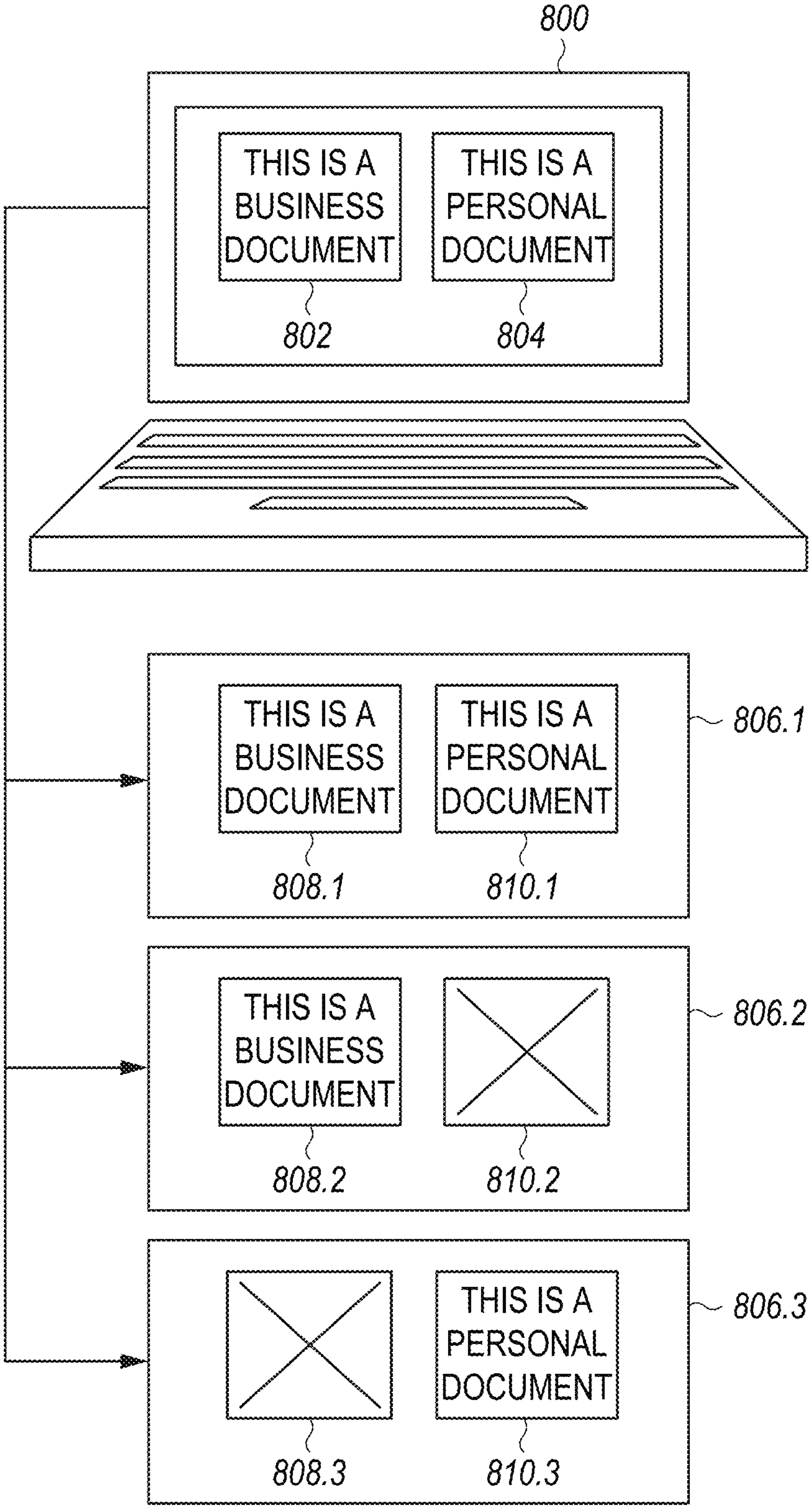
FIG. 8 illustrates examples of a computing machine sharing visual data with capturing processes, in accordance with some embodiments.

FIG. 8 illustrates examples of a computing machine 800 sharing visual data with capturing processes, in accordance with some embodiments. As shown the computing machine 800 displays a window 802 associated with a business document and a window 804 associated with a personal document. The computing machine 800 may generate computing data 806.1, 806.2 or 806.3 for output to capturing processes, such as a process associated with a monitoring application, a screen recording application, or a video calling application.

In the computing data 806.1, the block 808.1 includes the content of the window 802 and the block 810.1 includes the content of the window 804. The computing data 806.1 may correspond to a capturing process that captures all of the visual output displayed by the computing machine 800. However, in some cases, it may be desirable to avoid capturing personal content (e.g., for business employee monitoring software) or business content (e.g., in screensharing during a personal video call).

In the computing data 806.2, the block 808.2 includes the content of the window 802. The block 810.2, positioned in a location corresponding to the window 804, does not include the content of the window 804. Instead, the block 810.2 includes a preset visual signal. The preset visual signal may be an overlay, a blur, an obscuring, or a part of a preset image (e.g., a company logo or another image). The computing data 806.2 may be provided, for example, to a business-related capturing process, such as a business screensharing or screen recording application, a business video calling application, or an employee monitoring application.

In the computing data 806.3, the block 808.3, positioned in a location corresponding to the window 802, does not include the content of the window 802. Instead, the block 808.3 includes a preset visual signal. The preset visual signal may be an overlay, a blur, an obscuring, or a part of a preset image (e.g., a company logo or another image). the block 810.3 includes the content of the window 804. The computing data 806.2 may be provided, for example, to a personal, non-business-related capturing process, such as a personal screensharing or screen recording application, a personal video calling application, or a personal monitoring application.

The computing data 806.1 may be transmitted to a capturing process that captures all on-screen data. The computing data 806.2 may be transmitted to a capturing process that captures business data but not personal data, for example, an employee monitoring process. The computing data 806.3 may be transmitted to a capturing process that captures personal data but not business data, for example, a personal screen recording process.

The description of FIG. 8 discusses the segregation of business and personal files. However, in some cases, other types of files may be segregated. For example, a user of a computing machine might keep sensitive files and applications (e.g., files and applications related to finances or estate planning) as well as non-sensitive files and applications (e.g., family photographs, family videos, or gaming files and applications). The user might apply a security policy (similar to the business security policy described herein) to the sensitive files and applications in order to prevent them from being inadvertently tampered with or accessed.

Figure 9:
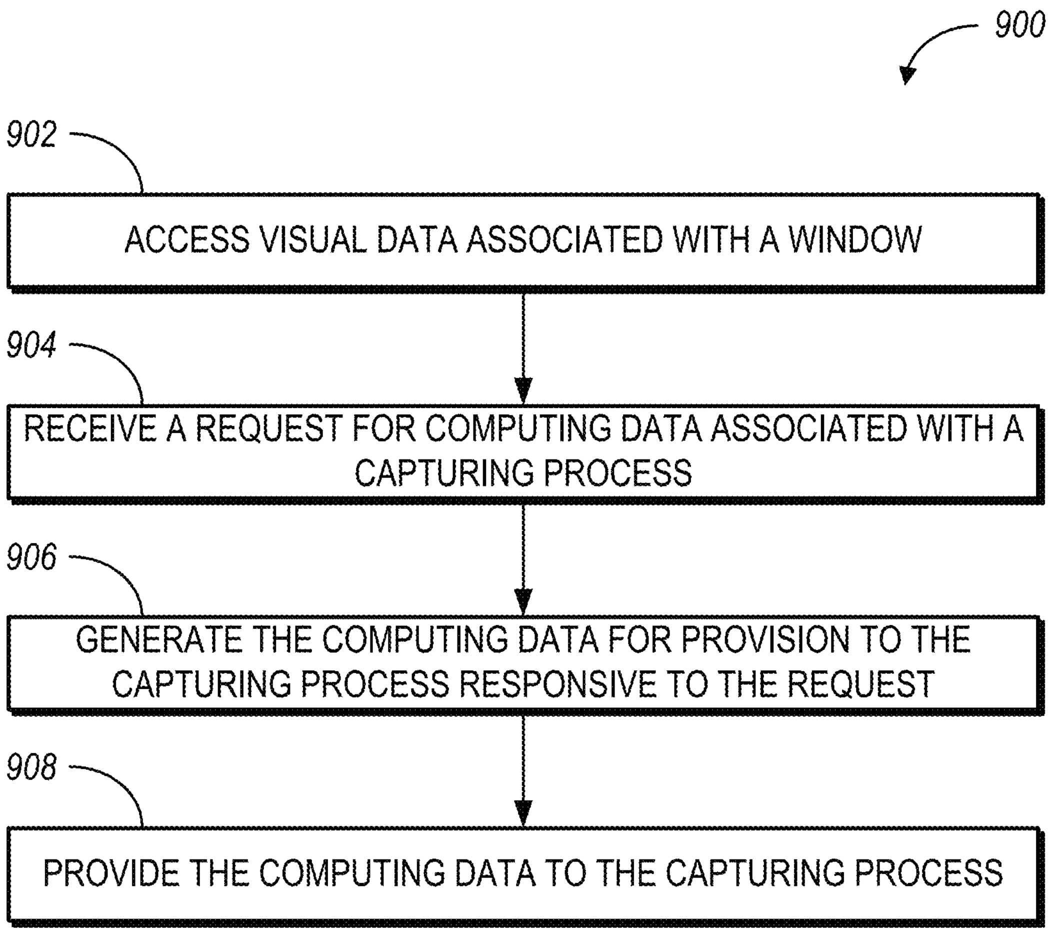
FIG. 9 is a flowchart of a method for limiting sharing of visual data, in accordance with some embodiments.

FIG. 9 is a flowchart of a method 900 for limiting sharing of visual data, in accordance with some embodiments. The method 900 may be performed by a computing machine, such as the computing machine 100, which may incorporate the system 200.

At block 902, a low-level engine (e.g., the low-level engine 206) of the computing machine (or software that communicates with the low-level engine) accesses visual data (e.g., the visual data 204) associated with a window (e.g., the window 202). The low-level engine may include at least one of a kernel, a driver, or a desktop window manager. The visual data may include a graphical output. In some cases, the low-level engine transmits the visual data to a display device for display on the display device. The display device may be at least one of a monitor or a screen. The display device may correspond to one or more displays associated with at least one of a display driver or a display port. In some cases, the low-level engine transmits the visual data to a virtual screen.

At block 904, the low-level engine (or the software that communicates with the low-level engine) receives a request for computing data (e.g., the computing data 208) associated with a capturing process. The capturing process may be associated with at least one of activity recording software, video conferencing software, application capturing software, user experience software, customer engagement software, or digital customer experience software.

At block 906, the low-level engine generates the computing data for provision to the capturing process responsive to the request. Generating the computing data includes, among other things, determining whether to include the visual data in the computing data based on at least one of an identifier of the window or an identifier of the capturing process. Generating the computing data may include composing the computing data.

In some implementations, if the computing machine determines to include the visual data associated with the window in the computing data for provision to the capturing process, the computing machine displays, adjacent to the window, a visual indicator. The visual indicator indicates (e.g., to the user of the computing machine) that the visual data associated with the window is being transmitted to the capturing process. In some examples, the visual indicator is a border for the window displayed along the edge of the window (e.g., within n pixels of the edge of the window, where n is a positive integer). The border may be a solid-colored border in a preset color (e.g., blue, green, red, or yellow). Some examples of the visual indicator are described in conjunction with FIG. 12.

At block 908, the low-level engine provides the computing data to the capturing process. In some cases, the computing machine determines that no active windows output visual information for provision to the capturing process. The computing machine terminates the capturing process in response to determining that no active windows output the visual information for provision to the capturing process. At a later time, the computing machine may open a new window that outputs the visual information for provision to the capturing process. The computing machine may restart the capturing process in response to opening the new window.

Figure 10:
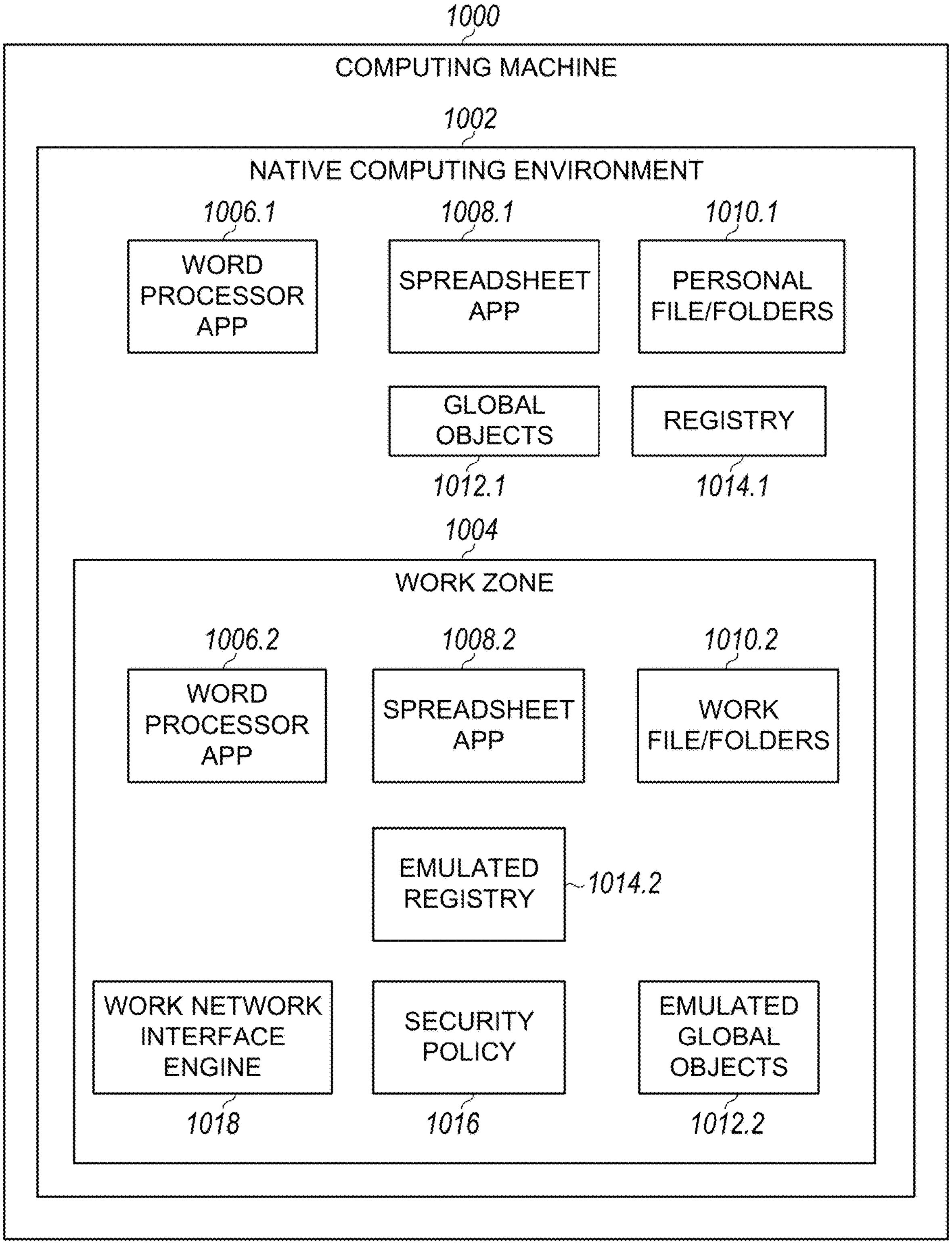
FIG. 10 is a block diagram of a computing machine with a work zone, in accordance with some embodiments.

FIG. 10 is a block diagram of a computing machine 1000 with a work zone 1004 within a native computing environment 1002, in accordance with some embodiments. As shown, the computing machine 1000 includes the native computing environment 1004. A portion of the native computing environment 1002 is the work zone 1004. As shown, the work zone 1004 is associated with a security policy 1016. The security policy applies to computing resources within the work zone 1004, but not to computing resources outside the work zone 1004. The work zone 1004 also includes a work network interface engine 1018. The work network interface engine 1018 processes network access requests associated with the work zone 1004 via a separate tunnel and/or a separate Internet Protocol (IP) address based on the security policy 1016. The work network interface engine 1018 may provide a VPN for computing resources within the work zone 1004 to use in order access the Internet. Computing resources outside the work zone 1004 might not use the VPN of the work network interface engine 1018.

As shown, the native computing environment 1002, outside the work zone 1004, includes applications, such as the illustrated word processor app 1006.1 and spreadsheet app 1008.1. When these applications are executed from the work zone 1004, separate instances of the applications, such as the word processor app 1006.2 and the spreadsheet app 1008.2 are created. The activities of the computing machine 1000 (e.g., the user's activities) in the word processor app 1006.2 and the spreadsheet app 1008.2 are supervised by the security policy 1016. However, the activities of the computing machine in the word processor app 1006.1 and the spreadsheet app 1008.1 are not supervised by the security policy 1016.

As shown, the native computing environment 1002 includes personal files/folders 1010.1 and work files/folders 1010.2. The work files/folder 1010.2 reside in the work zone 1004 and are supervised by the security policy 1016. The personal files/folders 1010.1 reside outside the work zone 1004 and are not supervised by the security policy 1016. According to some implementations, the personal files/folders 1010.1 and the work files/folders 1010.2 may correspond to different locations in a filesystem. For example, the personal files/folders 1010.1 may be at C:/personal/* and the work files/folders 1010.2 may be at C:/work/*, where * corresponds to a part of a file address string of the filesystem. The work zone 1004 may include the C:/work/* location of the filesystem where the work files/folders 1010.2 reside.

As shown, the native computing environment 1002 includes a registry 1014.1 externally to the work zone 1004. Within the work zone 1004, the registry is emulated as emulated registry 1014.2. Similarly, the native computing environment 1002 includes global objects 1012.1 externally to the work zone 1004. Within the work zone 1004, the global objects are emulated as emulated global objects 1012.2. When executing, applications 1006.2, 1008.2 within the work zone 1004 use the emulated registry 1014.2 and the emulated global objects 1012.2 instead of the registry 1014.1 and the global objects 1012.1. As a result, the object and registry values accessed by the executing applications 1006.2, 1008.2 within the work zone 1004 are supervised by the security policy 1016, and separate instances of the applications 1006, 1008 are used internally and externally to the work zone 1004.

In some embodiments, the computing machine 1000 stores, within a single user account, multiple supervised computing resources (e.g., work files/folders 1010.2) and multiple additional computing resources (e.g., personal files/folder 1010.1). The supervised computing resources are associated with the security policy 1016, while the unsupervised computing resources are not associated with the security policy 1016. The computing machine 1000 executes a first instance of a specified application (e.g., word processor app 1006.1 or spreadsheet app 1008.1) that lacks read access and lacks write access to any and all of the multiple supervised computing resources. The computing machine 1000 executes, simultaneously with the first instance, a second instance of the specified application (e.g., word processor app 1006.2 or spreadsheet app 1008.2) that accesses at least a portion of the multiple supervised computing resources. The computing machine 1000 applies rules from the security policy 1016 to the second instance of the specified application while foregoing applying the rules from the security policy 1016 to the first instance of the specified application.

In some embodiments, the computing machine 1000 stores multiple supervised computing resources (e.g., work files/folders 1010.2) and multiple additional computing resources (e.g., personal files/folders 1010.1). The multiple supervised computing resources are associated with the security policy 1016. The multiple supervised computing resources reside within a supervised zone (e.g., work zone 1004). The supervised zone comprises a portion of data associated with the native computing environment 1002 of the computing machine 1000. The computing machine 1000 executes a first instance of a specified application (e.g., word processor app 1006.1 or spreadsheet app 1008.1) externally to the supervised zone. The first instance has read access and has write access to data outside the supervised zone. The first instance lacks read access and lacks write access to data stored within the supervised zone. The computing machine 1000 executes, simultaneously with the first instance, a second instance of the specified application (e.g., word processor app 1006.2 or spreadsheet app 1008.2) within the supervised zone. The second instance has read access and lacks write access to data outside the supervised zone. The second instance has read access and has write access to data stored within the supervised zone. The second instance runs separately and distinctly from the first instance. For example, the second instance may leverage the emulated registry 1014.2 and the emulated global objects 1012.1 of the work zone 1004, while the first instance may leverage the registry 1014.1 and the global objects 1012.1 of the native computing environment 1002.

As used herein, "work" may include tasks, files, applications, windows, computing resources, or the like that are for a business, an organization, or any other entity type. A business may include an organization (e.g., a non-profit or a charity), a government entity (e.g., the Department of Motor Vehicles or the town tax collector), or a personal entity (e.g., a personal babysitting entity or a personal financial planning entity). The work resources may be any resources that are desirable to be segregated from personal resources by a business, an organization, a government entity, or a personal entity (e.g., a person who wants to segregate his/her babysitting or financial planning-related computing resources or to segregate other types of computing resources).

FIG. 10 demonstrates a technique for segregating work computing resources from non-work computing resources. In alternative implementations, other secure computing resources (e.g., financial computing resources) may be secured in a "secure zone" similar to the work zone 1004 of FIG. 10. In some cases, capturing rules (e.g., for provision of the computing data 208 to the capturing process 210) may distinguish based on whether a window is associated with a file or an application in the secure zone.

Figure 11:
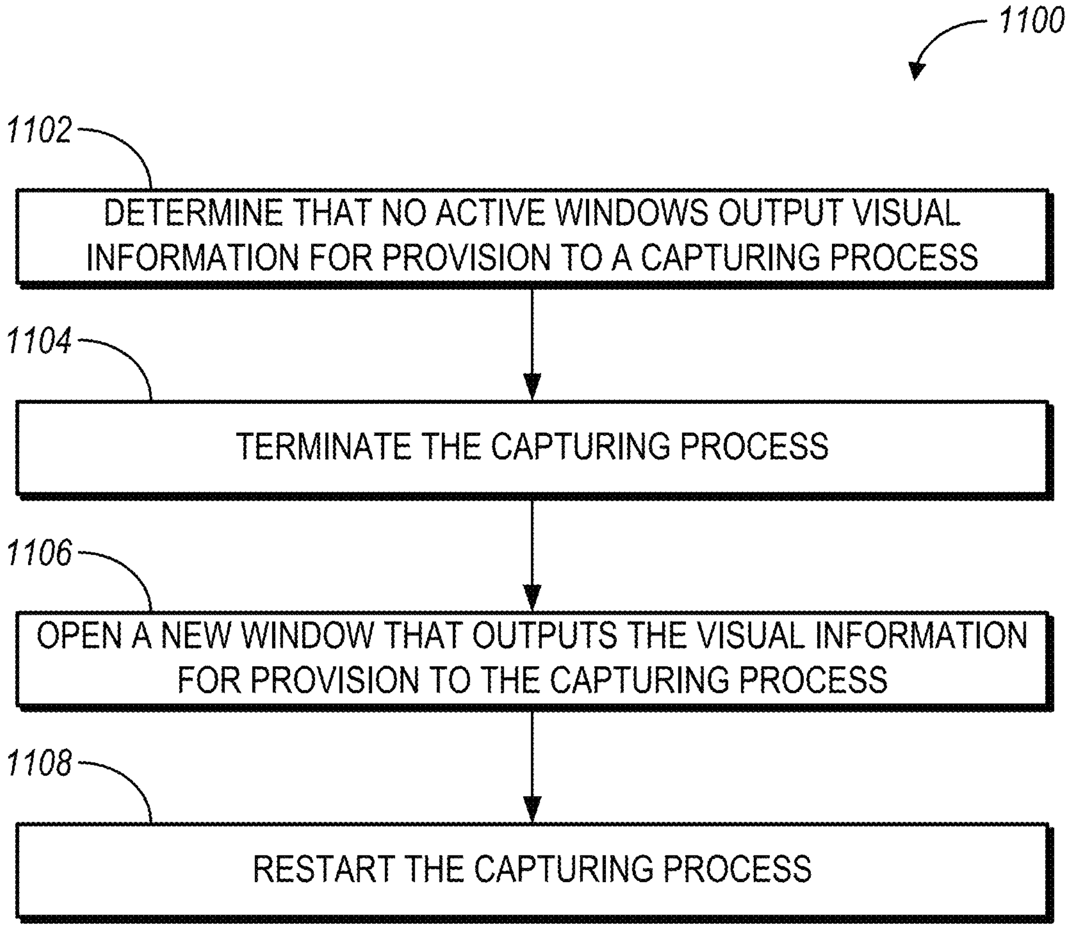
FIG. 11 is a flowchart of a method for operating a capturing process, in accordance with some embodiments.

FIG. 11 is a flowchart of a method 1100 for operating a capturing process, in accordance with some embodiments. The method 1100 may be performed by a computing machine, such as the computing machine 100, which may incorporate the system 200.

At block 1102, the computing machine determines determining that no active windows (e.g., of one or more open windows, such as the window 202, open on the computing machine) output visual information for provision to the capturing process (e.g., the capturing process 210). A computing machine may run one or more active windows that are open on the computing machine and are used to access computing resources (e.g., files or applications) on the computing machine.

At block 1104, the computing machine terminates the capturing process in response to determining that no active windows output the visual information for provision to the capturing process. The capturing process may be terminated to save at least one of processing, memory, or network interface resources of the computing machine. As a result, the user might experience faster processing or network speeds, due to the use of the computing machine being unencumbered by the capturing process.

At block 1106, the computing machine opens a new window that outputs the visual information for provision to the capturing process. For example, the user of the computing machine may operate the GUI to cause the computing machine to open a new window that accesses computing resources within a secure zone (e.g., the work zone 1004) and the computing machine may output visual information of windows associated with the work zone to the capturing process (e.g., a monitoring process, for example, for devices of employees of a business).

At block 1108, the computing machine restarts the capturing process in response to opening the new window. As a result, the capturing process is running when there is at least one active window (e.g., new window) that outputs the visual information for provision to the capturing process. The capturing process is not running when there is no such active window, saving processing, memory, and/or network interface resources for other uses. This may result in improvements to the user experience, as the capturing process does not use processing, memory, and/or network interface resources when it is not generating any output.

In conjunction with the disclosed technology, various techniques could be used to determine whether visual data associated with a window is to be provided to a capturing process and, thereby, whether the window is to have a visual indicator indicating the provision of the visual data to the capturing process. In some cases, the memory of the computing machine includes a supervised zone (e.g., the work zone 1004) and any window that runs an application or accesses a file from the supervised zone has its visual data provided to the capturing process. In some cases, a user may access an application via different accounts (e.g., a work account associated with a work email address or a personal account associated with a personal email address) and windows associated with some of those accounts (e.g., the work account) might have their visual data provided to the capturing process while windows associated with other accounts (e.g., the personal account) might not have their visual data provided to the capturing process. In some cases, certain computing resources (e.g., files or applications) of the computing machine may be designated as "supervised" while other computing resources are designated as unsupervised, with windows associated with the supervised resources having their visual data provided to the capturing process, and windows not associated with supervised resources not having their visual data provided to the capturing process.

The identification of "supervised" computing resources or of the supervised zone of the computing machine may be done by a user of the computing machine. Alternatively, this identification may be done remotely by an administrator of the computing machine (e.g., an information technology administrator of a business associated with the computing machine). The supervised zone may correspond to one or more regions of memory and/or one or more directories in a file system.

As described above, visual data of windows may be provided to the capturing process. In some implementations, the capturing process may receive other data, such as at least one of on-screen visual data, camera-generated data, audio data from a microphone, web browsing data, application usage data, file system access data, remote access data, printing data, keyboard usage data, mouse usage data, or touchscreen usage data. The other data received by the capturing process may be persistently indicated on a display of the computing machine (e.g., within a display region having the visual indicator (e.g., surrounded by the border)). For example, the display region may include the text "Camera-generated data and audio data from the microphone are being shared with the employee monitoring software because you are logged into your work account in at least one application." This allows the user of the computing machine to learn or verify what information is being provided to the capturing process, as well as to determine steps to take (e.g., log out of work account in each and every application) to avoid the provision of the information to the capturing process.

As used herein, computing resource may include, for example, a file, an application, a network interface overlay (e.g., a network tunnel), a window or the like. A computing resource may be stored in a memory of a computing machine.

Figure 12:
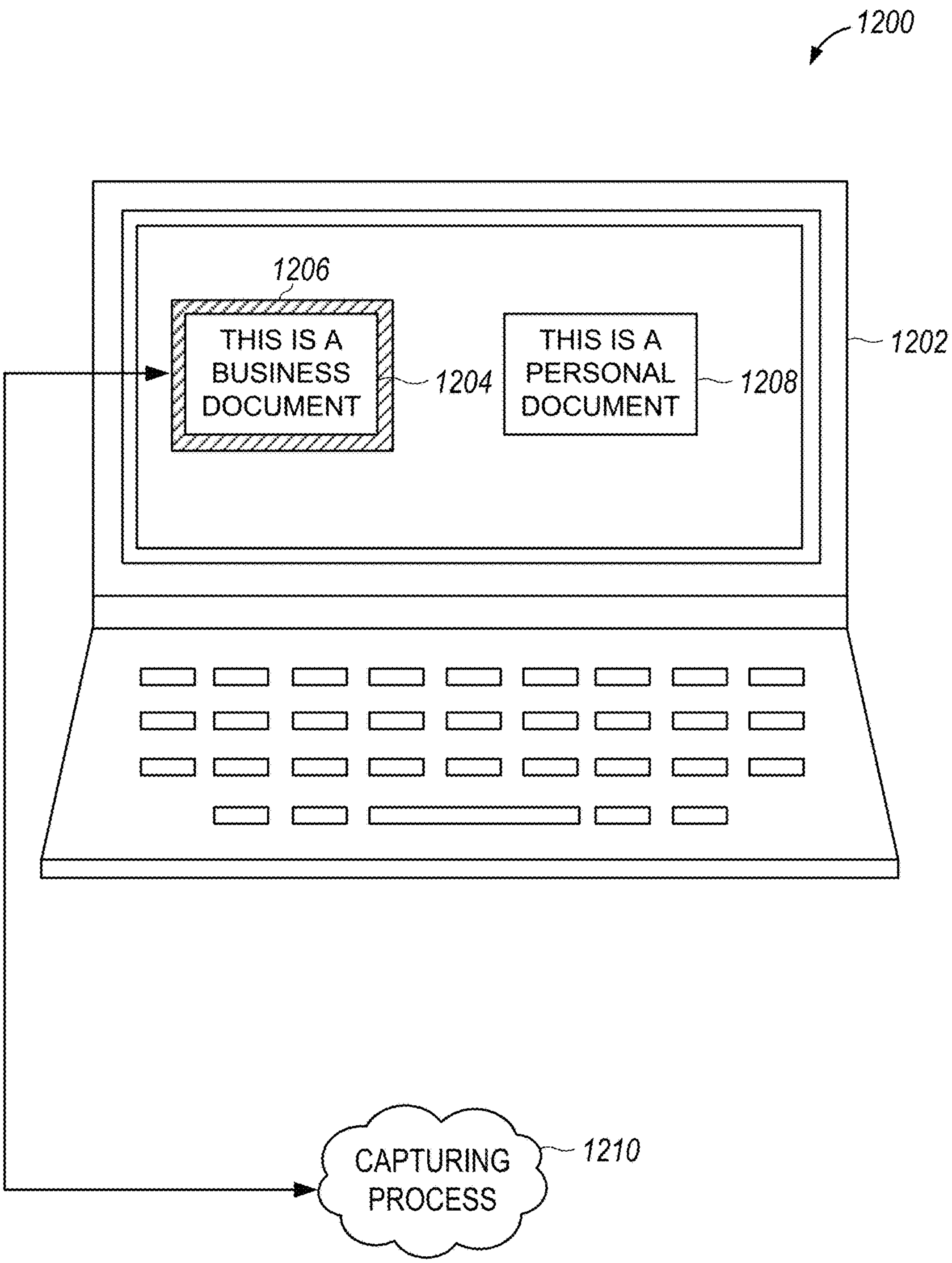
FIG. 12 illustrates an example system in which a mixed used computing machine may be used, in accordance with some embodiments.

FIG. 12 illustrates an example system 1200 in which a mixed used computing machine may be used. As shown, the system 1200 includes a computing machine 1202 and a capturing process 1210. The capturing process 1210 is illustrated as being external to the computing machine 1202. In alternative implementations, the capturing process 1210 executes within the computing machine 1202. As shown, the computing machine 1202 is a laptop computer. However, in alternative implementations, the computing machine 1202 may be any computing machine that includes processing circuitry and memory, for example, a desktop computer, a mobile phone, a tablet computer, a smart watch, a personal digital assistant (PDA), and the like. The computing machine 1202 may include all or a portion of the components of the computing machine 100. As shown, the capturing process 1210 executes in a cloud service. The capturing process 1210 may be associated with one or more of a cloud-based tracking service, one or more servers, an administrator computing device associated with a security policy enforced at the computing machine 1202, and the like.

The computing machine 1202 may store multiple personal computing resources and multiple business computing resources. For example, the computing machine 1202 may be a bring your own device (BYOD) device that is owned by an employee of a business and includes some business computing resources for use in association with the employee's job. The capturing process 1210 is for monitoring or tracking the use of the business computing resources without otherwise compromising the employee's privacy. Some of the computing resources on the computing machine 1202, for example, personal computing resource 1208 and business computing resource 1204, may be displayed via a display device (e.g., screen or monitor) of the computing machine 1202. Both the business computing resource 1204 and the personal computing resource 1208 may be displayed via a native computing environment of the computing machine 1202, rather than by accessing a remote virtual machine or physical machine. Alternatively, the business computing resources 1204 and/or the personal computing resources 1208 may be associated with a remote virtual machine or physical machine.

The personal computing resources and the business computing resources may be segregated in different ways. In some embodiments, personal computing resources and business computing resources reside in specified predefined locations of a file system. For example, certain directories may be associated with business computing resources and certain other directories may be associated with personal computing resources. In some embodiments, the personal computing resources are associated with personal filetypes (e.g. .jpg or .mp3) while the business computing resources are associated with business filetypes (e.g., .doc or .xls). In some embodiments, the personal computing resources are generated by certain applications (e.g., a camera application) while the business computing resources are generated by certain other applications (e.g., a word processor, a spreadsheet program, or a slide presentation program).

As used herein, the phrase "native computing environment" encompasses its plain and ordinary meaning. A computing resource (e.g., an application, a file or a window) runs in a native computing environment if it is run directly in an operating system (e.g., of a physical computing machine storing the computing resource, without any external software layers and without requiring access to a virtual machine or virtualization software or, alternatively, directly on a virtual machine).

In some embodiments, a "supervised zone" (which could also be referred to as a "business zone" or "work zone") may be defined within the native computing environment of a computing machine. The supervised zone may include computing resources residing in a portion of a filesystem of the computing machine or of a cloud storage unit. The supervised zone may also include network interface overlays (e.g., network tunnels) for accessing the network. The supervised zone may include certain applications. In some embodiments, a security policy may be applied to computing resources within the supervised zone but not to computing resources external to the supervised zone.

The computing machine 1202 may store a security policy that applies to the business computing resources (e.g., the business computing resource 1204) but not to the personal computing resources (e.g., the personal computing resource 1208). The security policy may limit screen capture of the business computing resources, sharing of the business computing resources, copying data from the business computing resources, and the like. The security policy may also allow for tracking, by the capturing process 1210, of use of the business computing resources at the computing machine 1202. While enforcing the security policy, the capturing process 1210 might not track the user of personal computing resources at the computing device.

As shown in FIG. 12, the computing machine 1202 displays, on a coupled display unit, the business computing resource 1204 and the personal computing resource 1208. A visual indicator 1206 adjacent to the business computing resource 1204 indicates that the business computing resource 1204 is subject to the security policy and to tracking by the capturing process 1210. The personal computing resource 1208 lacks such a visual indicator because it is not subject to the security policy and to the tracking by the capturing process 1210. As shown, the visual indicator 1206 is a border. However, in other embodiments, the visual indicator 1206 may include one or more of a border, a badge, and the like.

In some embodiments, the visual indicator 1206 is a border. The border may occupy points outside the business computing resource 1204 that are within a distance of n or fewer pixels from the business computing resource 1204 (where n is a positive integer), unless those pixels are occupied by other computing resources (e.g., windows) that are more dominant than the business computing resource 1204 in a computing resource stack. The other computing resources may be more dominant, for example, if they have been used more recently than the business computing resource 1204.

As discussed above, business computing resources are subject to the security policy and the tracking. Personal computing resources are not subject to the security policy and the tracking. However, in alternative embodiments, computing resources different from personal/business may be used. For example, a parent might give a child a computing machine with some resources (e.g., web browser, video player) that the parent wishes to track and/or manage and other resource (e.g., word processor, chess playing application stored in local memory) that the parent does not wish to track and/or manage. Alternatively, an investor might wish to have his/her financial advisor be able to track and/or manage resources (e.g., investment company website, investment company application) that are used for investment management purposes but not other resources (e.g., other websites, applications or files).

Some embodiments are described as numbered examples (Example 1, 2, 3, etc.). These are provided as examples only and do not limit the technology disclosed herein.

Example 1 is a method comprising: receiving, at a low-level engine or using software that communicates with the low-level engine, a request for computing data associated with a capturing process, wherein the low-level engine comprises at least one of a kernel, a driver, or a desktop window manager; generating the computing data for provision to the capturing process responsive to the request, wherein generating the computing data comprises determining to include, visual data associated with a window in the computing data based on at least one of an identifier of the window or an identifier of the capturing process; displaying a visual indicator to indicate that the visual data associated with the window is being transmitted to the capturing process; and providing the computing data to the capturing process.

In Example 2, the subject matter of Example 1 includes, determining to include the visual data in the computing data based on a stored indication that information of the window is approved for transmission to the capturing process, wherein the stored indication is associated with at least one of an application of the window or content within the window.

In Example 3, the subject matter of Examples 1-2 includes, determining not to include the visual data in the computing data based on a lack of a stored indication that information of the window is approved for transmission to the capturing process, wherein generating the computing data comprises including, within the computing data, a preset visual signal in place of the visual data, wherein the preset visual signal comprises at least one of an overlay, a blur, or at least a part of a preset image.

In Example 4, the subject matter of Examples 1-3 includes, wherein the visual data comprise a graphical output, and wherein the capturing process is associated with at least one of activity recording software, video conferencing software, application capturing software, user experience software, customer engagement software, digital customer experience software, or employee productivity software.

In Example 5, the subject matter of Examples 1-4 includes, wherein the visual data comprise a graphical output, the method further comprising: transmitting, by the low-level engine, the visual data to a display device for display on the display device.

In Example 6, the subject matter of Examples 1-5 includes, wherein the visual data comprise a graphical output, the method further comprising: transmitting, by the low-level engine, the visual data to a virtual screen.

In Example 7, the subject matter of Examples 1-6 includes, wherein the computing data is composed at the low-level engine or the software that communicates with the low-level engine.

In Example 8, the subject matter of Examples 1-7 includes, wherein determining whether to include the visual data in the computing data and displaying the visual indicator are based on whether the window executes within a supervised zone of memory of a computing device or whether the window accesses data within the supervised zone, wherein the visual indicator comprises a badge or a border adjacent to the window.

In Example 9, the subject matter of Examples 1-8 includes, wherein the desktop window manager is configured to draw at least one of a graphical user interface of a desktop, a wallpaper, an icon, the window, or a login screen.

In Example 10, the subject matter of Examples 1-9 includes, wherein the visual data comprise at least one of a graphical user interface of a desktop, virtual display data, screenshot data, or screen display data.

In Example 11, the subject matter of Examples 1-10 includes, wherein the visual data comprise at least one of virtual desktop data, full screen visual data, partial screen visual data associated with a range of coordinates of a screen, or delta visual data indicating a change of imagery on the screen.

In Example 12, the subject matter of Examples 1-11 includes, wherein the identifier of the capturing process comprises at least one of a digital signature, a process name, process identifier, or location where the capturing process is stored.

In Example 13, the subject matter of Examples 1-12 includes, wherein the window comprises at least one of a virtual desktop or a visual output of an application.

In Example 14, the subject matter of Examples 1-13 includes, wherein the identifier of the window is based on at least one of a parent of the window or a process associated with the window.

In Example 15, the subject matter of Examples 1-14 includes, wherein the identifier of the window comprises at least one of an identifier of an account being used to access an application associated with the window, an identifier of an application being executed in the window, an identifier of an application generating the window, or an identifier of a process associated with the window.

In Example 16, the subject matter of Example 15 includes, wherein the identifier of the process associated with the window comprises at least one of an identifier of a supervised application being used to access the process, a process name of a process associated with the window, a location of a process associated with the window, or a digital signature of a process associated with the window.

In Example 17, the subject matter of Examples 1-16 includes, determining that no active windows output visual information for provision to the capturing process; and terminating the capturing process in response to determining that no active windows output the visual information for provision to the capturing process.

In Example 18, the subject matter of Example 17 includes, opening a new window that outputs the visual information for provision to the capturing process; and restarting the capturing process in response to opening the new window.

Example 19 is a computer-readable medium storing instructions operable to cause processing circuitry to perform operations comprising: receiving, at a low-level engine or using software that communicates with the low-level engine, a request for computing data associated with a capturing process, wherein the low-level engine comprises at least one of a kernel, a driver, or a desktop window manager; generating the computing data for provision to the capturing process responsive to the request, wherein generating the computing data comprises determining to include, visual data associated with a window in the computing data based on at least one of an identifier of the window or an identifier of the capturing process; displaying a visual indicator to indicate that the visual data associated with the window is being transmitted to the capturing process; and providing the computing data to the capturing process.

In Example 20, the subject matter of Example 19 includes, the operations further comprising: determining to include the visual data in the computing data based on a stored indication that information of the window is approved for transmission to the capturing process, wherein the stored indication is associated with at least one of an application of the window or content within the window.

In Example 21, the subject matter of Examples 19-20 includes, the operations further comprising: determining not to include the visual data in the computing data based on a lack of a stored indication that information of the window is approved for transmission to the capturing process, wherein generating the computing data comprises including, within the computing data, a preset visual signal in place of the visual data, wherein the preset visual signal comprises at least one of an overlay, a blur, or at least a part of a preset image.

In Example 22, the subject matter of Examples 19-21 includes, wherein the visual data comprise a graphical output, and wherein the capturing process is associated with at least one of activity recording software, video conferencing software, application capturing software, user experience software, customer engagement software, digital customer experience software, or employee productivity software.

In Example 23, the subject matter of Examples 19-22 includes, wherein the visual data comprise a graphical output, the operations further comprising: transmitting, by the low-level engine, the visual data to a display device for display on the display device.

In Example 24, the subject matter of Examples 19-23 includes, wherein the visual data comprise a graphical output, the operations further comprising: transmitting, by the low-level engine, the visual data to a virtual screen.

In Example 25, the subject matter of Examples 19-24 includes, wherein the computing data is composed at the low-level engine or the software that communicates with the low-level engine.

In Example 26, the subject matter of Examples 19-25 includes, wherein determining whether to include the visual data in the computing data and displaying the visual indicator are based on whether the window executes within a supervised zone of memory of a computing device or whether the window accesses data within the supervised zone, wherein the visual indicator comprises a badge or a border adjacent to the window.

In Example 27, the subject matter of Examples 19-26 includes, wherein the desktop window manager is configured to draw at least one of a graphical user interface of a desktop, a wallpaper, an icon, the window, or a login screen.

In Example 28, the subject matter of Examples 19-27 includes, wherein the visual data comprise at least one of a graphical user interface of a desktop, virtual display data, screenshot data, or screen display data.

In Example 29, the subject matter of Examples 19-28 includes, wherein the visual data comprise at least one of virtual desktop data, full screen visual data, partial screen visual data associated with a range of coordinates of a screen, or delta visual data indicating a change of imagery on the screen.

In Example 30, the subject matter of Examples 19-29 includes, wherein the identifier of the capturing process comprises at least one of a digital signature, a process name, process identifier, or location where the capturing process is stored.

In Example 31, the subject matter of Examples 19-30 includes, wherein the window comprises at least one of a virtual desktop or a visual output of an application.

In Example 32, the subject matter of Examples 19-31 includes, wherein the identifier of the window is based on at least one of a parent of the window or a process associated with the window.

In Example 33, the subject matter of Examples 19-32 includes, wherein the identifier of the window comprises at least one of an identifier of an account being used to access an application associated with the window, an identifier of an application being executed in the window, an identifier of an application generating the window, or an identifier of a process associated with the window.

In Example 34, the subject matter of Example 33 includes, wherein the identifier of the process associated with the window comprises at least one of an identifier of a supervised application being used to access the process, a process name of a process associated with the window, a location of a process associated with the window, or a digital signature of a process associated with the window.

In Example 35, the subject matter of Examples 19-34 includes, the operations further comprising: determining that no active windows output visual information for provision to the capturing process; and terminating the capturing process in response to determining that no active windows output the visual information for provision to the capturing process.

In Example 36, the subject matter of Example 35 includes, the operations further comprising: opening a new window that outputs the visual information for provision to the capturing process; and restarting the capturing process in response to opening the new window.

Example 37 is a system comprising: memory; and processing circuitry configured to execute instructions stored in the memory to perform operations comprising: receiving, at a low-level engine or using software that communicates with the low-level engine, a request for computing data associated with a capturing process, wherein the low-level engine comprises at least one of a kernel, a driver, or a desktop window manager; generating the computing data for provision to the capturing process responsive to the request, wherein generating the computing data comprises determining to include, visual data associated with a window in the computing data based on at least one of an identifier of the window or an identifier of the capturing process; displaying a visual indicator to indicate that the visual data associated with the window is being transmitted to the capturing process; and providing the computing data to the capturing process.

In Example 38, the subject matter of Example 37 includes, the operations further comprising: determining to include the visual data in the computing data based on a stored indication that information of the window is approved for transmission to the capturing process, wherein the stored indication is associated with at least one of an application of the window or content within the window.

In Example 39, the subject matter of Examples 37-38 includes, the operations further comprising: determining not to include the visual data in the computing data based on a lack of a stored indication that information of the window is approved for transmission to the capturing process, wherein generating the computing data comprises including, within the computing data, a preset visual signal in place of the visual data, wherein the preset visual signal comprises at least one of an overlay, a blur, or at least a part of a preset image.

In Example 40, the subject matter of Examples 37-39 includes, wherein the visual data comprise a graphical output, and wherein the capturing process is associated with at least one of activity recording software, video conferencing software, application capturing software, user experience software, customer engagement software, digital customer experience software, or employee productivity software.

In Example 41, the subject matter of Examples 37-40 includes, wherein the visual data comprise a graphical output, the operations further comprising: transmitting, by the low-level engine, the visual data to a display device for display on the display device.

In Example 42, the subject matter of Examples 37-41 includes, wherein the visual data comprise a graphical output, the operations further comprising: transmitting, by the low-level engine, the visual data to a virtual screen.

In Example 43, the subject matter of Examples 37-42 includes, wherein the computing data is composed at the low-level engine or the software that communicates with the low-level engine.

In Example 44, the subject matter of Examples 37-43 includes, wherein determining whether to include the visual data in the computing data and displaying the visual indicator are based on whether the window executes within a supervised zone of memory of a computing device or whether the window accesses data within the supervised zone, wherein the visual indicator comprises a badge or a border adjacent to the window.

In Example 45, the subject matter of Examples 37-44 includes, wherein the desktop window manager is configured to draw at least one of a graphical user interface of a desktop, a wallpaper, an icon, the window, or a login screen.

In Example 46, the subject matter of Examples 37-45 includes, wherein the visual data comprise at least one of a graphical user interface of a desktop, virtual display data, screenshot data, or screen display data.

In Example 47, the subject matter of Examples 37-46 includes, wherein the visual data comprise at least one of virtual desktop data, full screen visual data, partial screen visual data associated with a range of coordinates of a screen, or delta visual data indicating a change of imagery on the screen.

In Example 48, the subject matter of Examples 37-47 includes, wherein the identifier of the capturing process comprises at least one of a digital signature, a process name, process identifier, or location where the capturing process is stored.

In Example 49, the subject matter of Examples 37-48 includes, wherein the window comprises at least one of a virtual desktop or a visual output of an application.

In Example 50, the subject matter of Examples 37-49 includes, wherein the identifier of the window is based on at least one of a parent of the window or a process associated with the window.

In Example 51, the subject matter of Examples 37-50 includes, wherein the identifier of the window comprises at least one of an identifier of an account being used to access an application associated with the window, an identifier of an application being executed in the window, an identifier of an application generating the window, or an identifier of a process associated with the window.

In Example 52, the subject matter of Examples 37-51 includes, wherein the identifier of the process associated with the window comprises at least one of an identifier of a supervised application being used to access the process, a process name of a process associated with the window, a location of a process associated with the window, or a digital signature of a process associated with the window.

In Example 53, the subject matter of Examples 37-52 includes, the operations further comprising: determining that no active windows output visual information for provision to the capturing process; and terminating the capturing process in response to determining that no active windows output the visual information for provision to the capturing process.

In Example 54, the subject matter of Examples 37-53 includes, the operations further comprising: opening a new window that outputs the visual information for provision to the capturing process; and restarting the capturing process in response to opening the new window.

Example 55 is at least one apparatus comprising: means for receiving, at a low-level engine or using software that communicates with the low-level engine, a request for computing data associated with a capturing process, wherein the low-level engine comprises at least one of a kernel, a driver, or a desktop window manager; means for generating the computing data for provision to the capturing process responsive to the request, wherein generating the computing data comprises determining to include, visual data associated with a window in the computing data based on at least one of an identifier of the window or an identifier of the capturing process; means for displaying a visual indicator to indicate that the visual data associated with the window is being transmitted to the capturing process; and means for providing the computing data to the capturing process.

Example 56 is a method comprising: receiving, at the low-level engine or using the software that communicates with the low-level engine, a request for computing data associated with a capturing process, wherein the low-level engine comprises at least one of a kernel, a driver, or a desktop window manager; generating the computing data for provision to the capturing process responsive to the request, wherein generating the computing data comprises determining whether to include, the computer-generated information in the computing data based on at least one of an identifier of the capturing process or data associated with the computer-generated information; and providing the computing data to the capturing process.

Example 57 is at least one machine-readable medium including instructions that, when executed by processing circuitry, cause the processing circuitry to perform operations to implement of any of Examples 1-56.

Example 58 is an apparatus comprising means to implement of any of Examples 1-56.

Example 59 is a system to implement of any of Examples 1-56.

Example 60 is a method to implement of any of Examples 1-56.

As used herein, unless explicitly stated otherwise, any term specified in the singular may include its plural version. For example, "a computer that stores data and runs software," may include a single computer that stores data and runs software or two computers—a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer-readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory" includes one or more memories, where each memory may be a computer-readable medium. Memory may encompass memory hardware units (e.g., a hard drive or a disk) that store data or instructions in software form. Alternatively or in addition, the memory may include data or instructions that are hard-wired into processing circuitry. The memory may include a single memory unit or multiple joint or disjoint memory units, with each of the multiple joint or disjoint memory units storing all or a portion of the data described as being stored in the memory.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory. Alternatively, an engine may be hard-wired into processing circuitry. In some cases, an engine includes a combination of software stored in the memory and hardware that is hard-wired into the processing circuitry.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:

receiving, by processing circuitry, at a low-level engine or using software that communicates with the low-level engine, a request for computing data associated with a capturing process, wherein the low-level engine comprises at least one of a kernel, a driver, or a desktop window manager;

generating, by the processing circuitry, the computing data for provision to the capturing process responsive to the request, wherein generating the computing data comprises determining to include visual data associated with a window in the computing data based on at least one of an identifier of the window or an identifier of the capturing process;

displaying, by the processing circuitry, a visual indicator to indicate that the visual data associated with the window is being transmitted to the capturing process; and providing, by the processing circuitry, the computing data to the capturing process.

2. A non-transitory computer-readable medium storing instructions operable to cause processing circuitry to perform operations comprising:

receiving, at a low-level engine or using software that communicates with the low-level engine, a request for computing data associated with a capturing process, wherein the low-level engine comprises at least one of a kernel, a driver, or a desktop window manager;

generating the computing data for provision to the capturing process responsive to the request, wherein generating the computing data comprises determining to include visual data associated with a window in the computing data based on at least one of an identifier of the window or an identifier of the capturing process;

displaying a visual indicator to indicate that the visual data associated with the window is being transmitted to the capturing process; and providing the computing data to the capturing process.

3. The non-transitory computer-readable medium of claim 2, the operations further comprising:

determining to include the visual data in the computing data based on a stored indication that information of the window is approved for transmission to the capturing process, wherein the stored indication is associated with at least one of an application of the window or content within the window.

4. The non-transitory computer-readable medium of claim 2, the operations further comprising:

determining not to include the visual data in the computing data based on a lack of a stored indication that information of the window is approved for transmission to the capturing process, wherein generating the computing data comprises including, within the computing data, a preset visual signal in place of the visual data, wherein the preset visual signal comprises at least one of an overlay, a blur, or at least a part of a preset image.

5. The non-transitory computer-readable medium of claim 2, wherein the visual data comprise a graphical output, and wherein the capturing process is associated with at least one of activity recording software, video conferencing software, application capturing software, user experience software, customer engagement software, digital customer experience software, or employee productivity software.

6. The non-transitory computer-readable medium of claim 2, wherein the visual data comprise a graphical output, the operations further comprising:

transmitting, by the low-level engine, the visual data to a display device for display on the display device.

7. The non-transitory computer-readable medium of claim 2, wherein the visual data comprise a graphical output, the operations further comprising:

transmitting, by the low-level engine, the visual data to a virtual screen.

8. The non-transitory computer-readable medium of claim 2, wherein the computing data is composed at the low-level engine or the software that communicates with the low-level engine.

9. The non-transitory computer-readable medium of claim 2, wherein determining whether to include the visual data in the computing data and displaying the visual indicator are based on whether the window executes within a supervised zone of memory of a computing device or whether the window accesses data within the supervised zone, wherein the visual indicator comprises a badge or a border adjacent to the window.

10. The non-transitory computer-readable medium of claim 2, wherein the desktop window manager is configured to draw at least one of a graphical user interface of a desktop, a wallpaper, an icon, the window, or a login screen.

11. The non-transitory computer-readable medium of claim 2, wherein the visual data comprise at least one of a graphical user interface of a desktop, virtual display data, screenshot data, or screen display data.

12. The non-transitory computer-readable medium of claim 2, wherein the visual data comprise at least one of virtual desktop data, full screen visual data, partial screen visual data associated with a range of coordinates of a screen, or delta visual data indicating a change of imagery on the screen.

13. The non-transitory computer-readable medium of claim 2, wherein the identifier of the capturing process comprises at least one of a digital signature, a process name, process identifier, or location where the capturing process is stored.

14. The non-transitory computer-readable medium of claim 2, wherein the window comprises at least one of a virtual desktop or a visual output of an application.

15. The non-transitory computer-readable medium of claim 2, wherein the identifier of the window is based on at least one of a parent of the window or a process associated with the window.

16. The non-transitory computer-readable medium of claim 2, wherein the identifier of the window comprises at least one of an identifier of an account being used to access an application associated with the window, an identifier of an application being executed in the window, an identifier of an application generating the window, or an identifier of a process associated with the window.

17. The non-transitory computer-readable medium of claim 16, wherein the identifier of the process associated with the window comprises at least one of an identifier of a supervised application being used to access the process, a process name of a process associated with the window, a location of a process associated with the window, or a digital signature of a process associated with the window.

18. The non-transitory computer-readable medium of claim 2, the operations further comprising:

determining that no active windows output visual information for provision to the capturing process; and terminating the capturing process in response to determining that no active windows output the visual information for provision to the capturing process.

19. The non-transitory computer-readable medium of claim 18, the operations further comprising:

opening a new window that outputs the visual information for provision to the capturing process; and restarting the capturing process in response to opening the new window.

20. A system comprising:

memory; and processing circuitry configured to execute instructions stored in the memory to perform operations comprising:

receiving, at a low-level engine or using software that communicates with the low-level engine, a request for computing data associated with a capturing process, wherein the low-level engine comprises at least one of a kernel, a driver, or a desktop window manager;

generating the computing data for provision to the capturing process responsive to the request, wherein generating the computing data comprises determining to include visual data associated with a window in the computing data based on at least one of an identifier of the window or an identifier of the capturing process;

displaying a visual indicator to indicate that the visual data associated with the window is being transmitted to the capturing process; and providing the computing data to the capturing process.

* * * * *